(12) United States Patent
Li et al.

(10) Patent No.: US 11,394,965 B2
(45) Date of Patent: Jul. 19, 2022

(54) METHOD FOR PROCESSING IMAGE ON BASIS OF INTRA PREDICTION MODE, AND DEVICE THEREFOR

(71) Applicant: LG ELECTRONICS INC., Seoul (KR)

(72) Inventors: Ling Li, Seoul (KR); Seunghwan Kim, Seoul (KR); Jin Heo, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 17/274,373

(22) PCT Filed: Sep. 11, 2019

(86) PCT No.: PCT/KR2019/011824
§ 371 (c)(1),
(2) Date: Mar. 8, 2021

(87) PCT Pub. No.: WO2020/055159
PCT Pub. Date: Mar. 19, 2020

(65) Prior Publication Data
US 2022/0053183 A1    Feb. 17, 2022

Related U.S. Application Data

(60) Provisional application No. 62/731,104, filed on Sep. 14, 2018, provisional application No. 62/729,981, filed on Sep. 11, 2018.

(51) Int. Cl.
*H04N 19/11* (2014.01)
*H04N 19/176* (2014.01)
(Continued)

(52) U.S. Cl.
CPC .......... *H04N 19/11* (2014.11); *H04N 19/176* (2014.11); *H04N 19/46* (2014.11); *H04N 19/593* (2014.11)

(58) Field of Classification Search
None
See application file for complete search history.

(56) References Cited

U.S. PATENT DOCUMENTS

2012/0314766 A1    12/2012 Chien et al.
2014/0226912 A1*   8/2014 Lee .................... H04N 19/107
                                                382/238
(Continued)

FOREIGN PATENT DOCUMENTS

KR    1020180019562 A    2/2018
KR    1020180042829 A    4/2018

*Primary Examiner* — Chikaodili E Anyikire
(74) *Attorney, Agent, or Firm* — Dentons US LLP

(57) ABSTRACT

Disclosed are a method for decoding a video signal and a device therefore. More particularly, a method for decoding an image based on an intra prediction mode, may comprise the steps of: acquiring a most probable mode (MPM) flag for indicating whether an MPM is applied to a current block, the MPM representing a mode in which an intra prediction mode of the current block is induced from an intra predicted block neighboring the current block; configuring an MPM list, on the basis of whether intra prediction modes of a left neighboring block and an above neighboring block of the current block satisfy predefined conditions, if the MPM is applied to the current block; acquiring an MPM index for indicating, within the MPM list, a specific intra prediction mode; and generating a prediction block for the current block by using the intra prediction mode specified by the MPM index.

11 Claims, 18 Drawing Sheets

(51) Int. Cl.
*H04N 19/46* (2014.01)
*H04N 19/593* (2014.01)

(56) References Cited

U.S. PATENT DOCUMENTS

2015/0010054 A1 1/2015 Francois et al.
2020/0021805 A1* 1/2020 Ko .......................... H04N 19/70

* cited by examiner

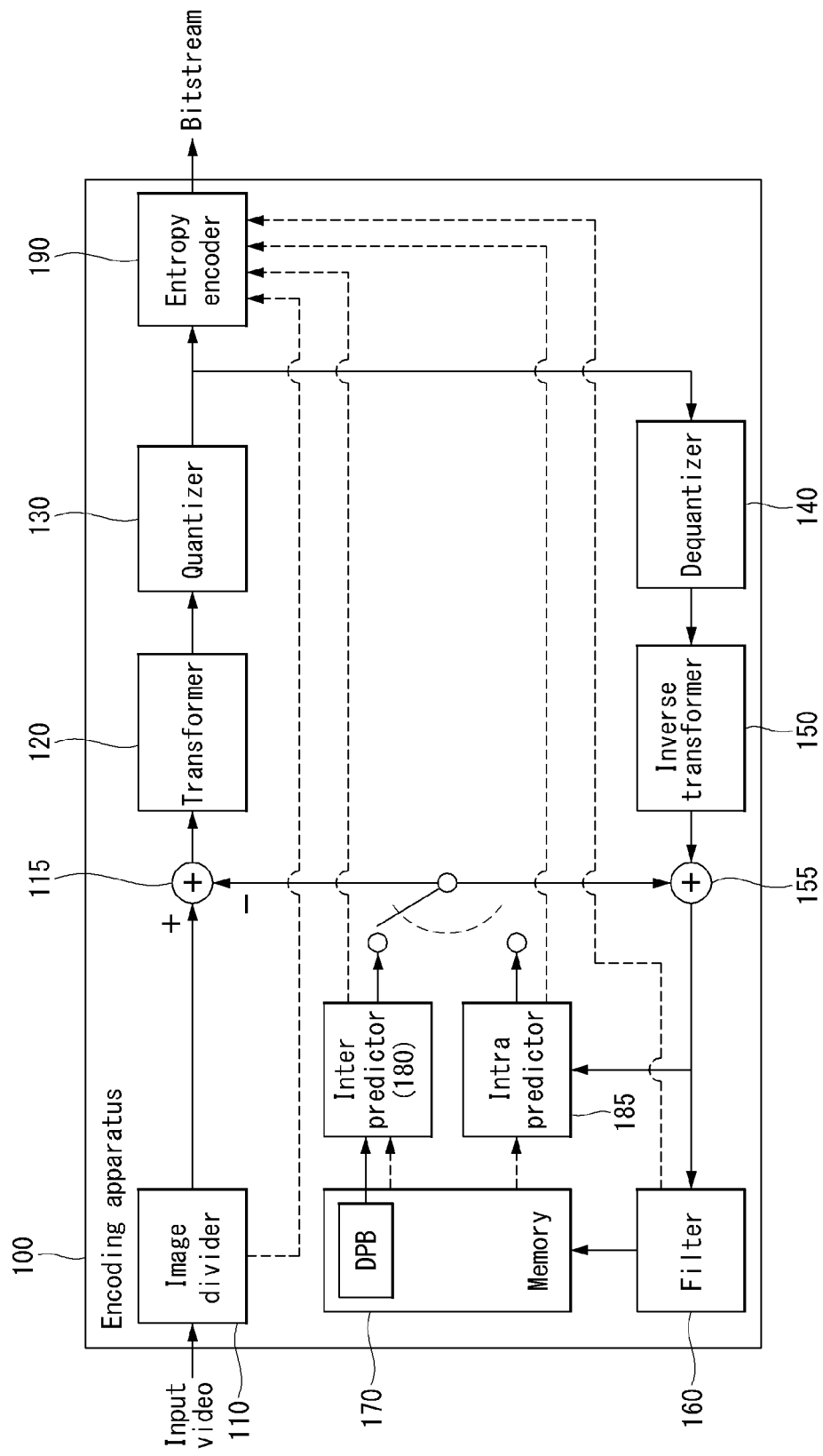
[Fig. 1]

[Fig. 2]
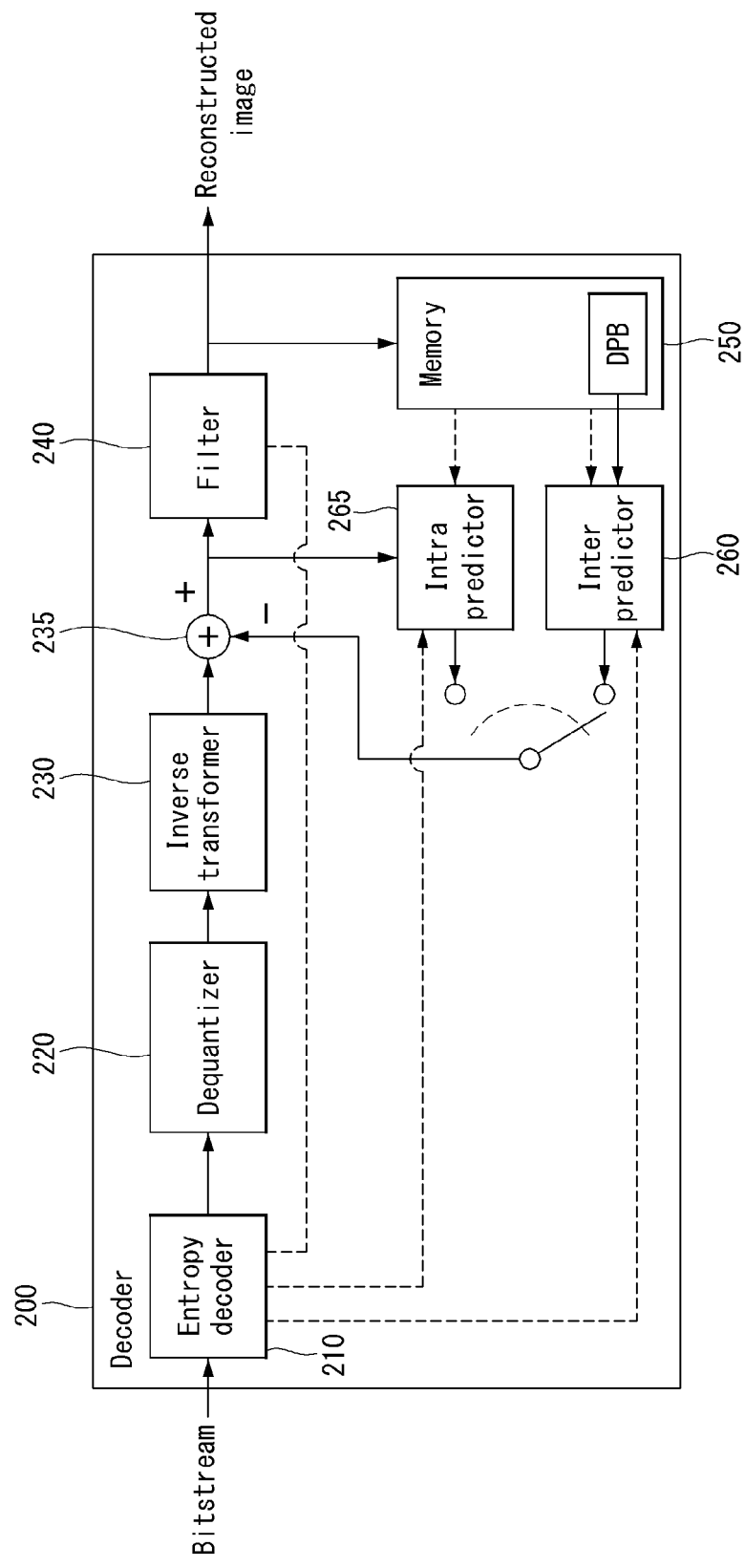

【Fig. 3】
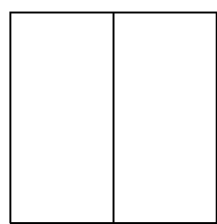 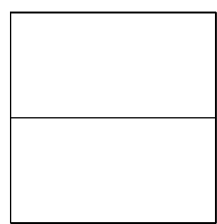 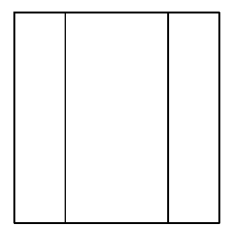 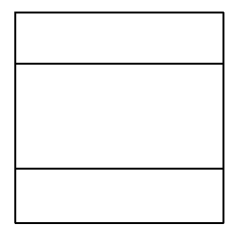
SPLIT_BT_VER   SPLIT_BT_HOR   SPLIT_TT_VER   SPLIT_TT_HOR

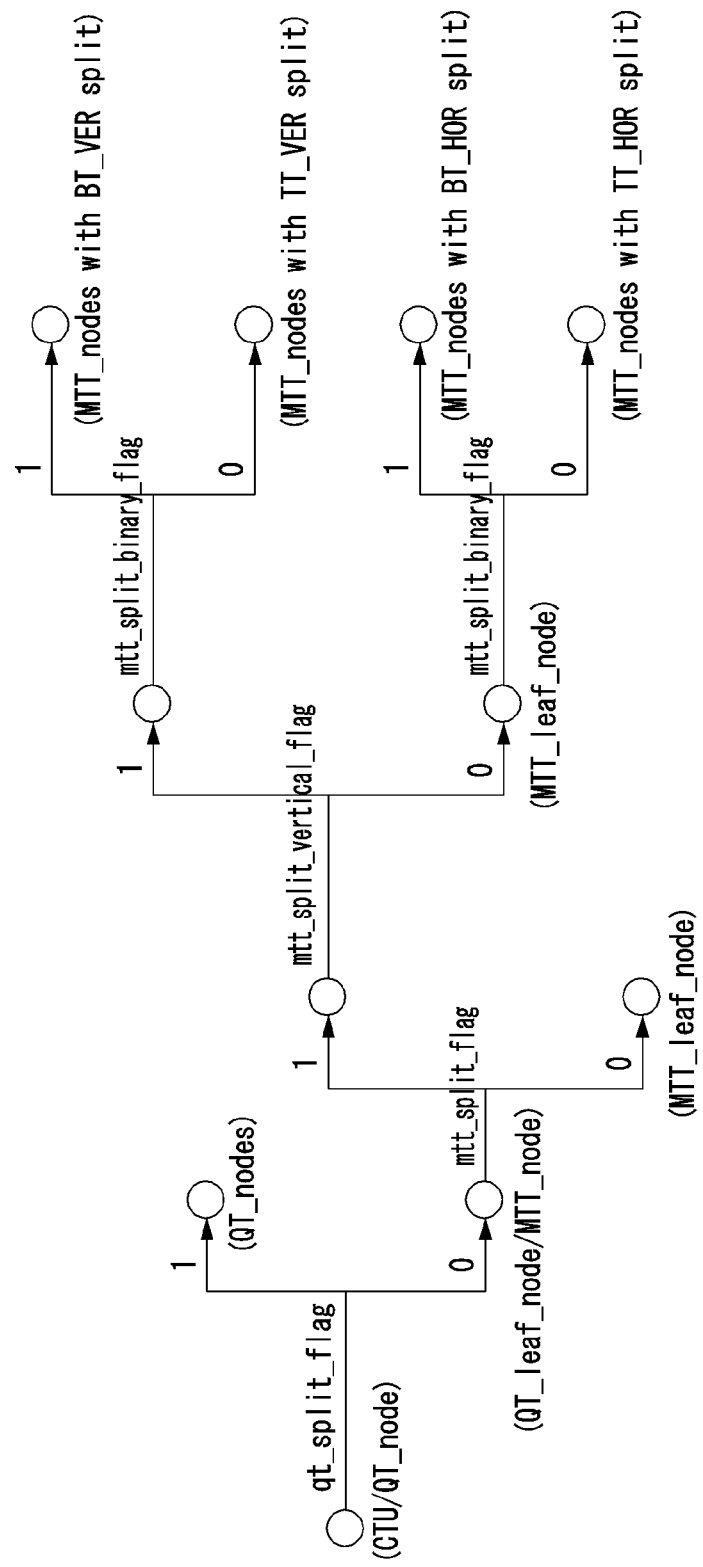
[Fig. 4]

【Fig. 5】
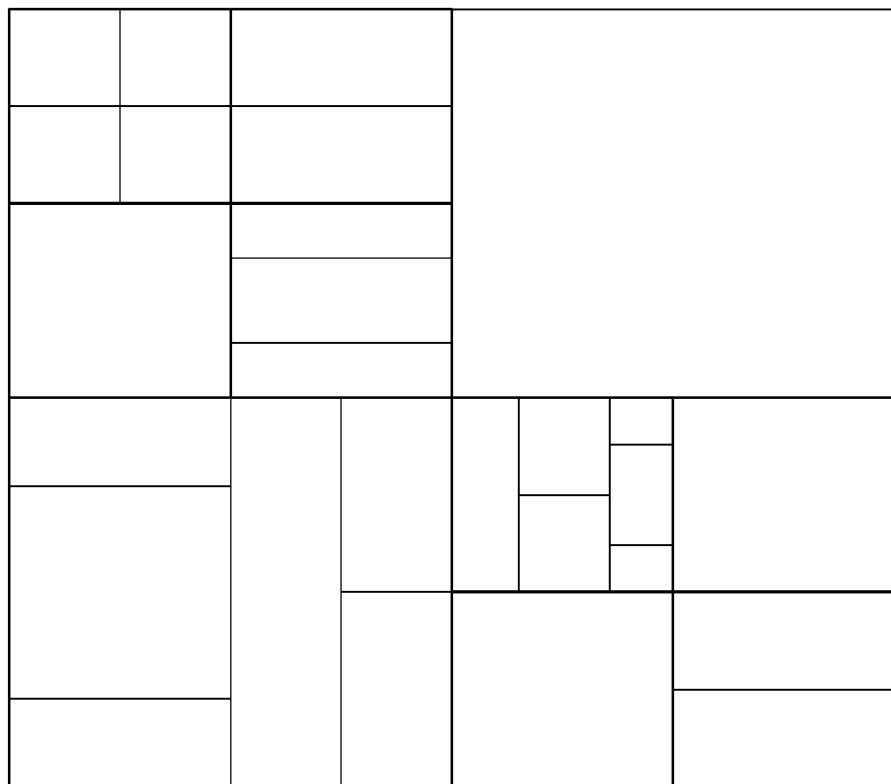
【Fig. 6】
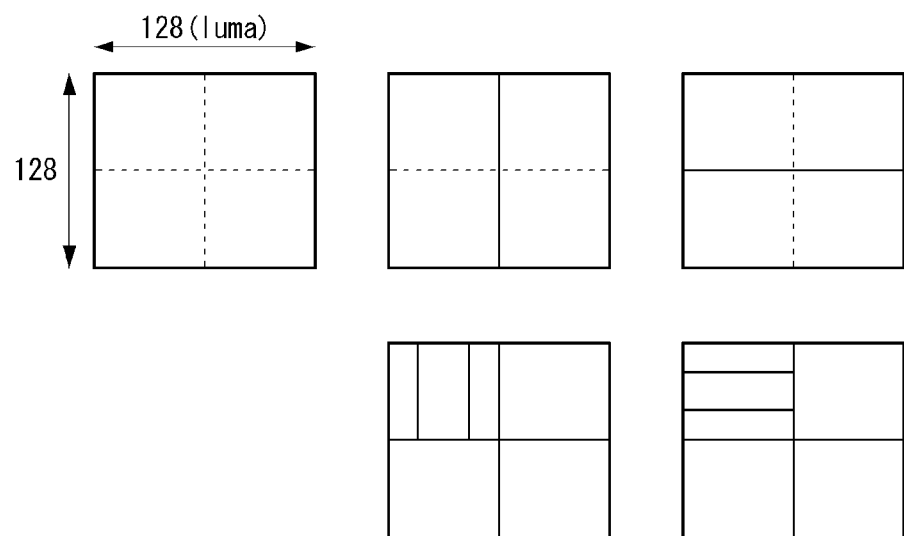

[Fig. 7]
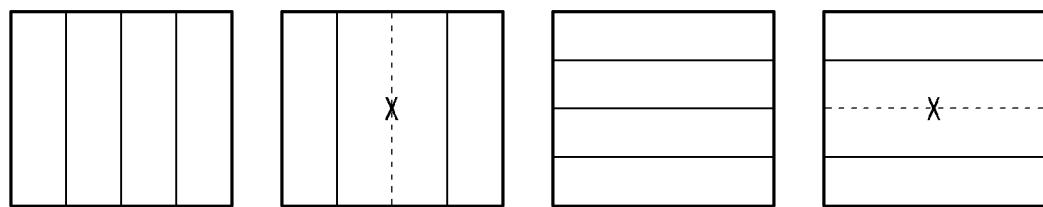
[Fig. 8]
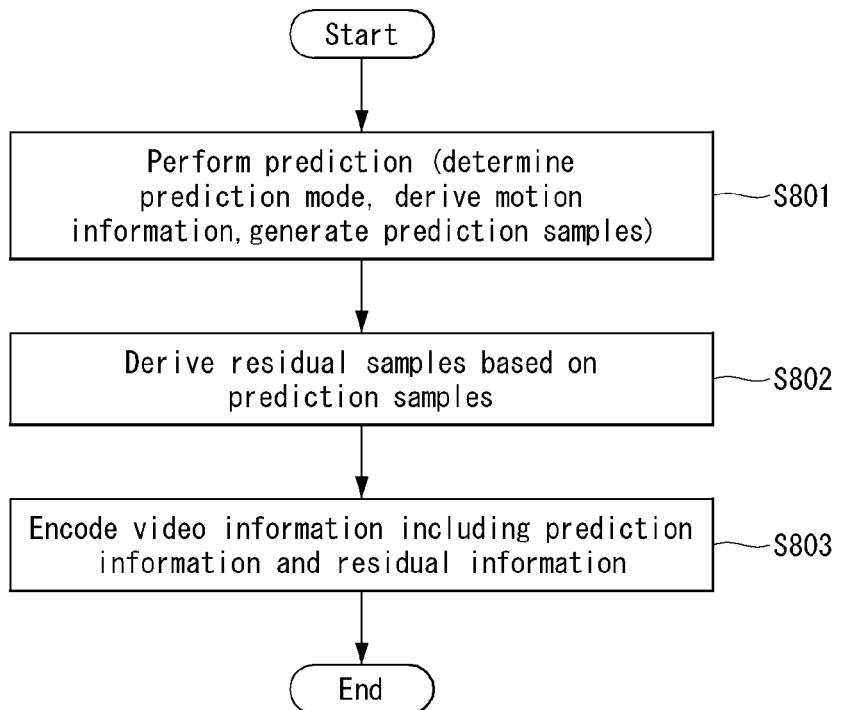

[Fig. 9]
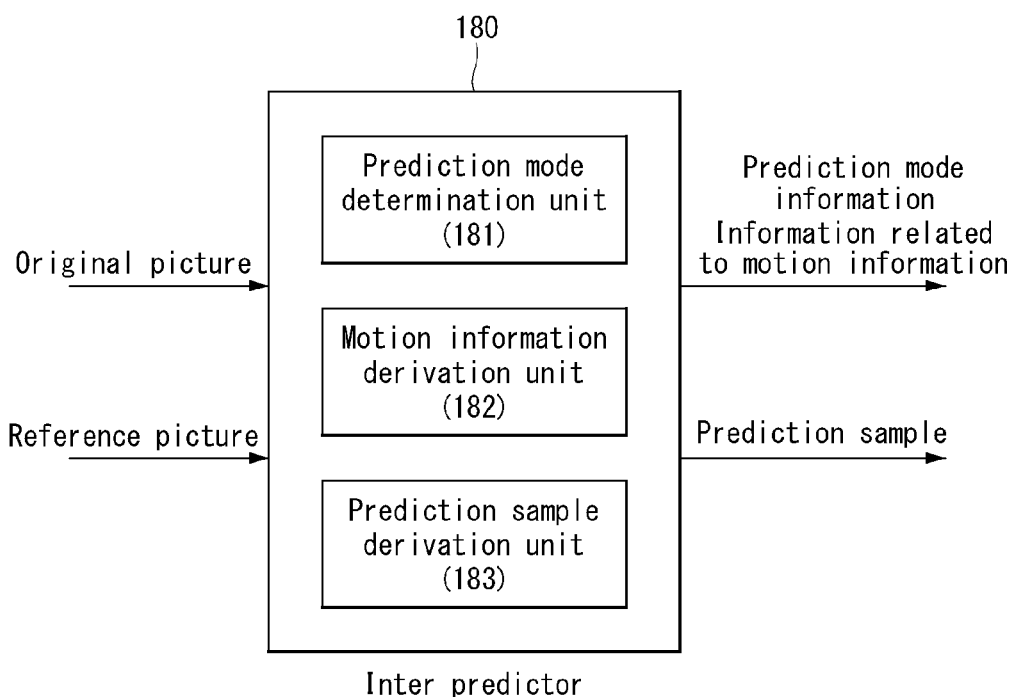

[Fig. 10]
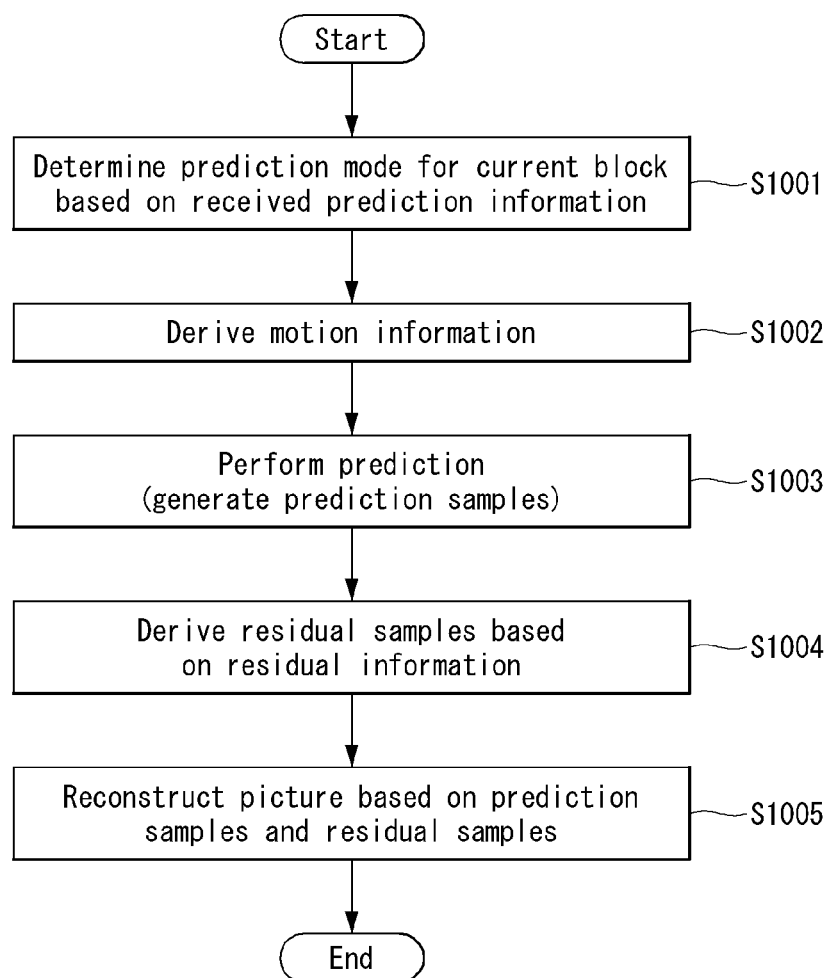

[Fig. 11]
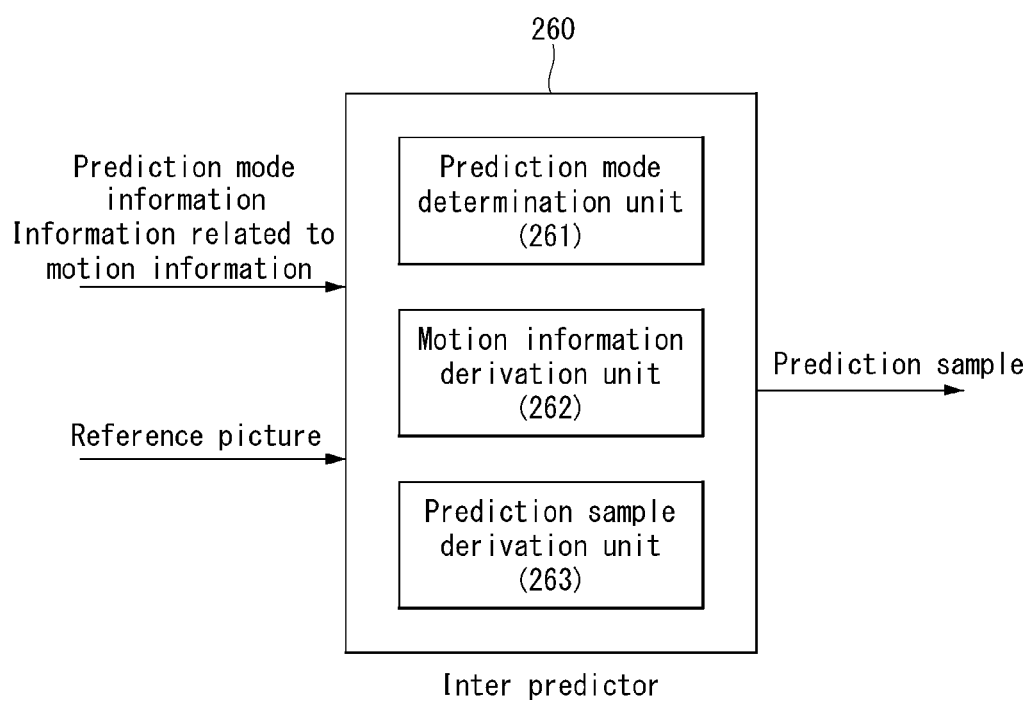

[Fig. 12]
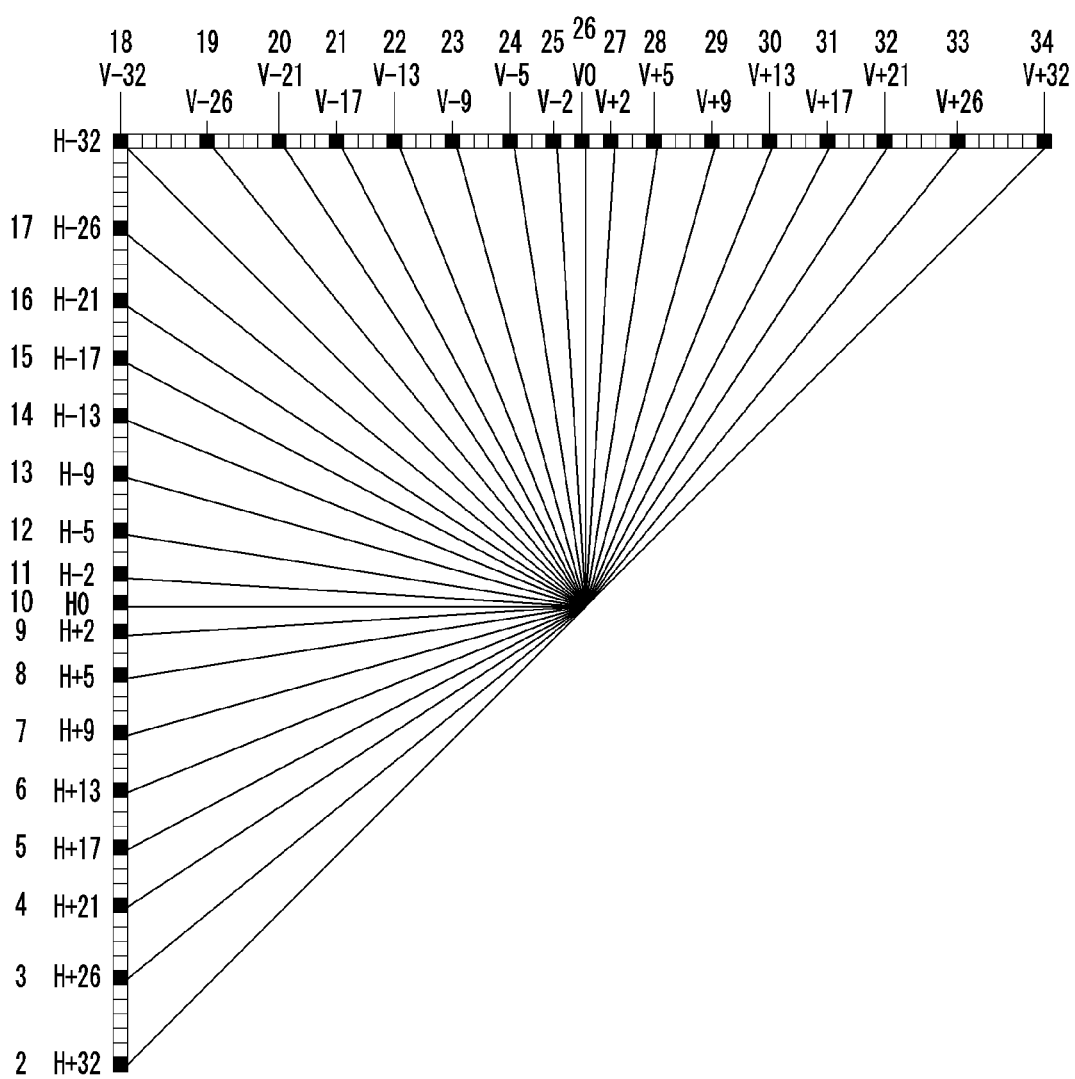

[Fig. 13]
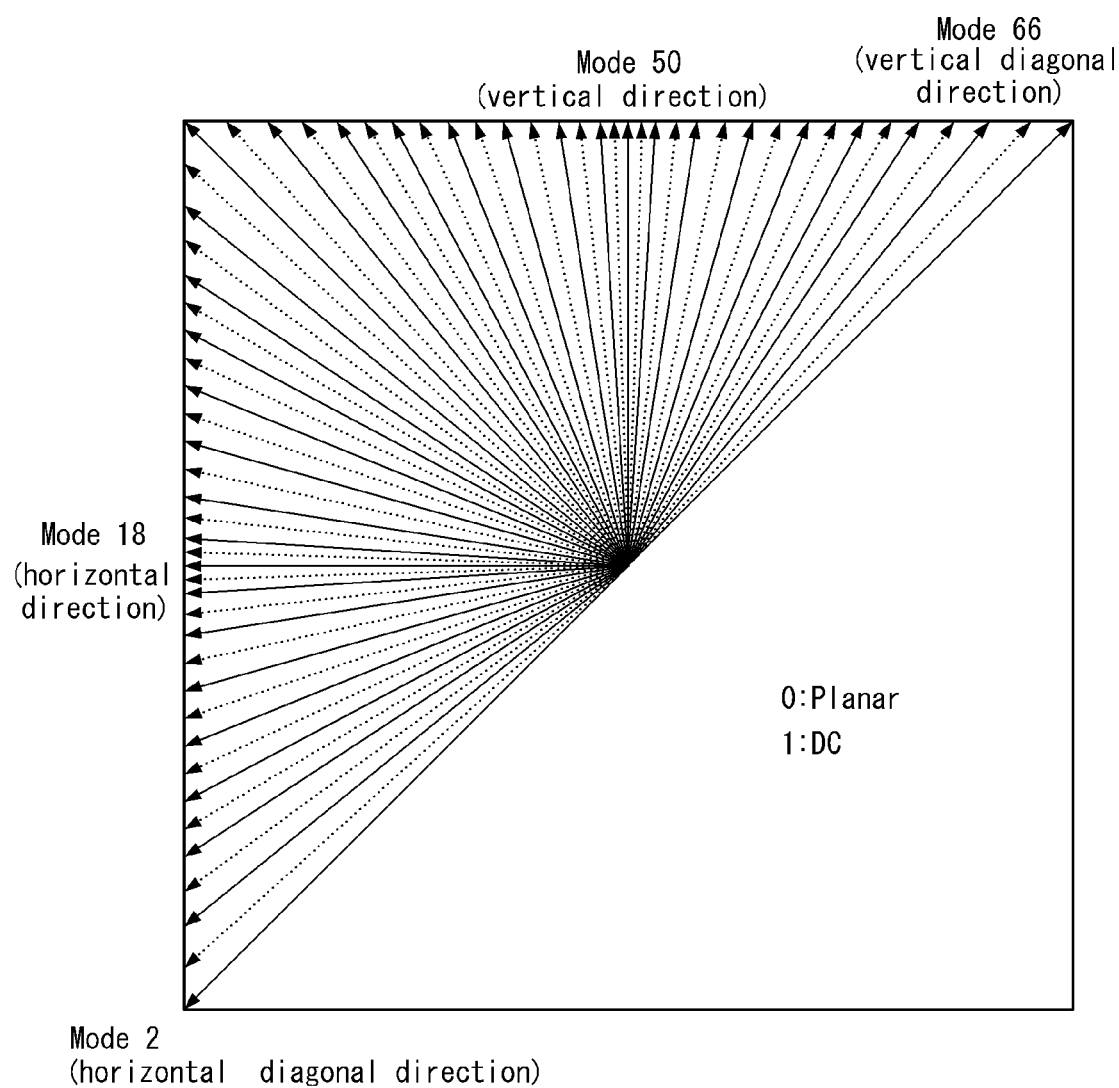

[Fig. 14]
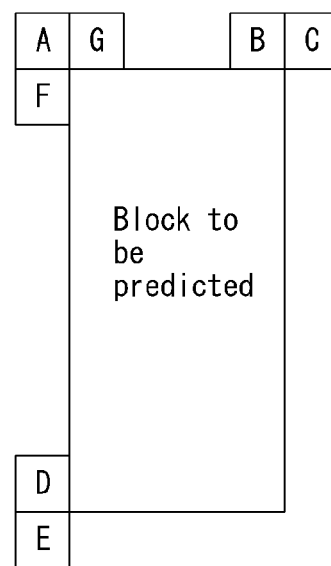

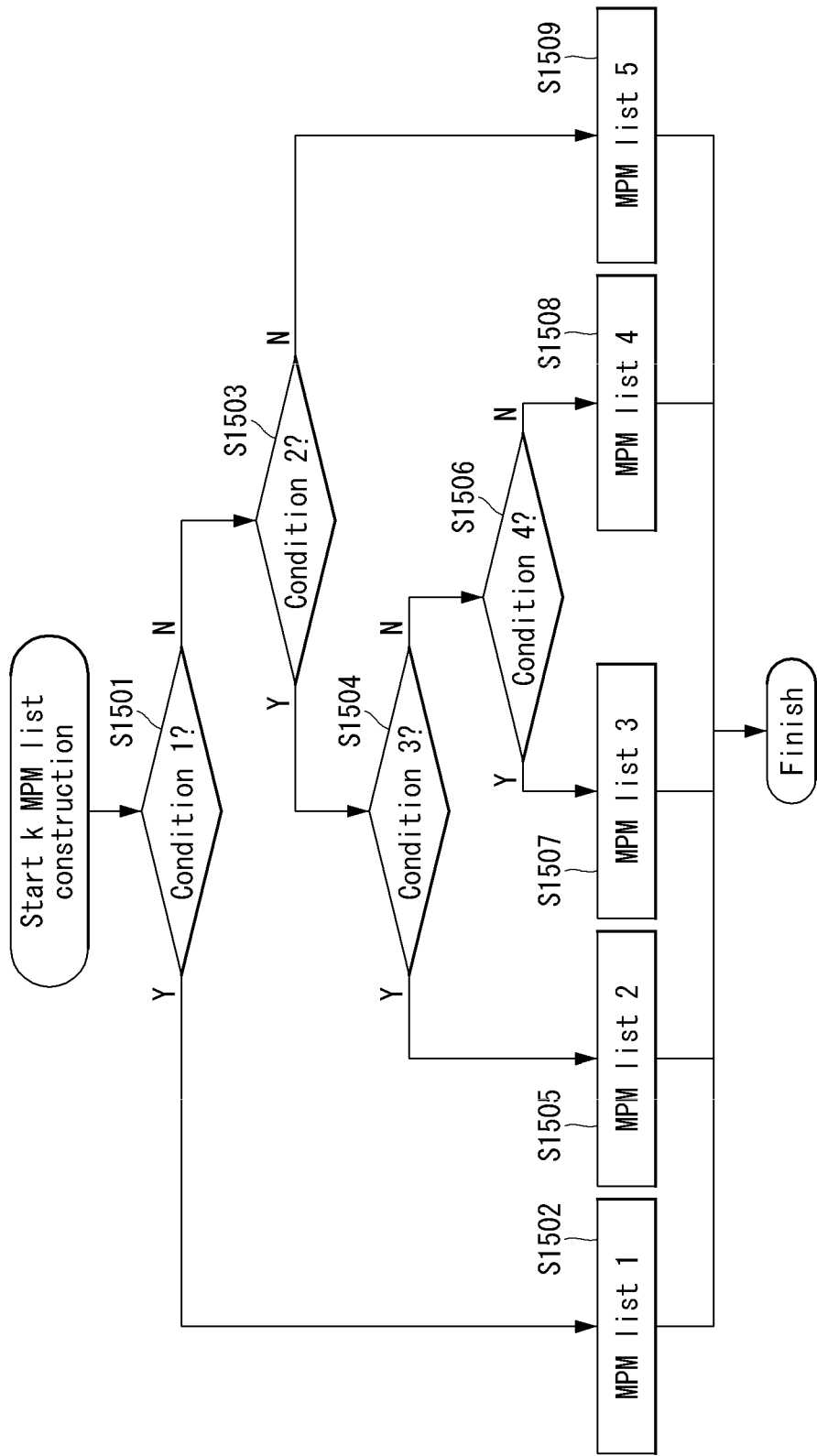

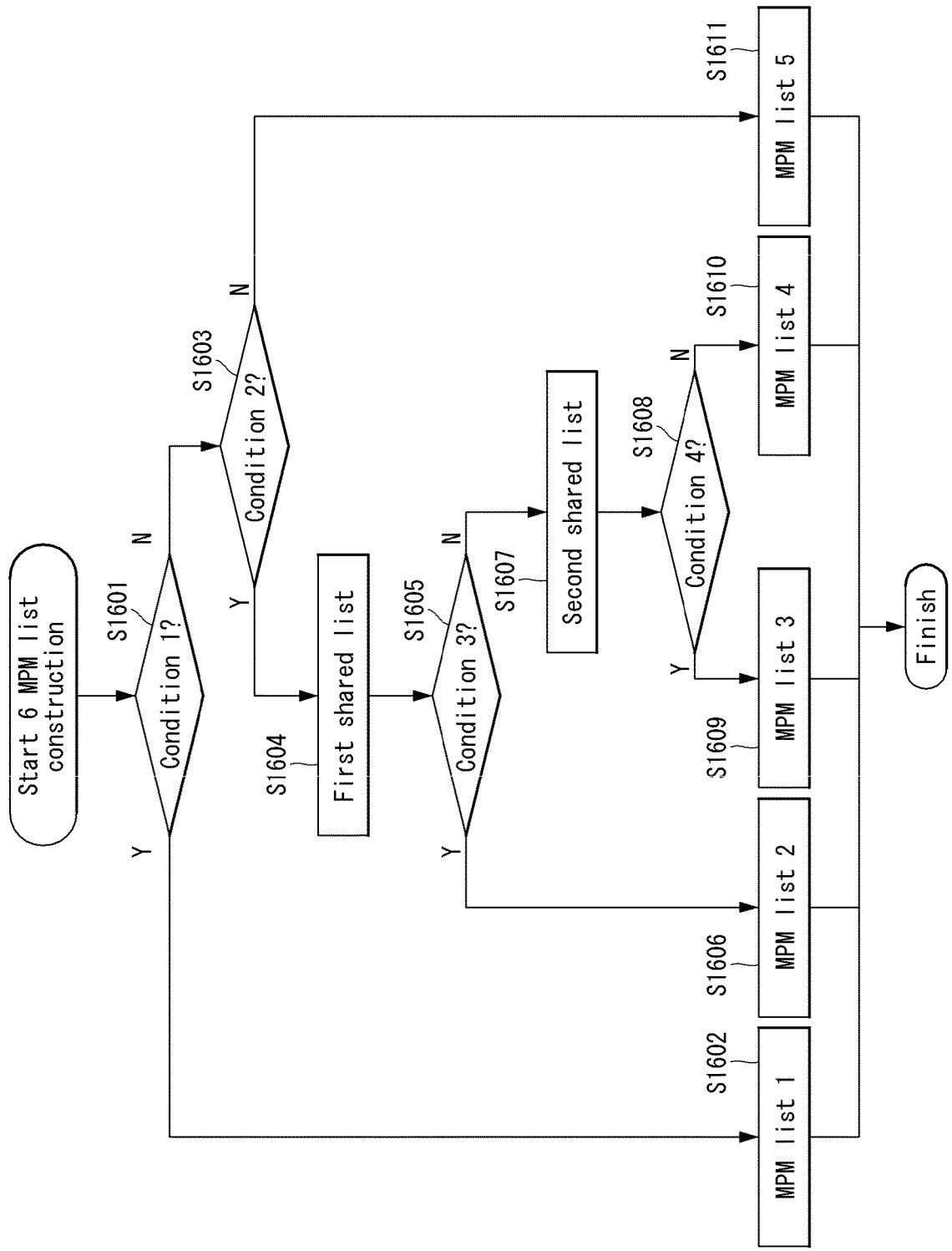

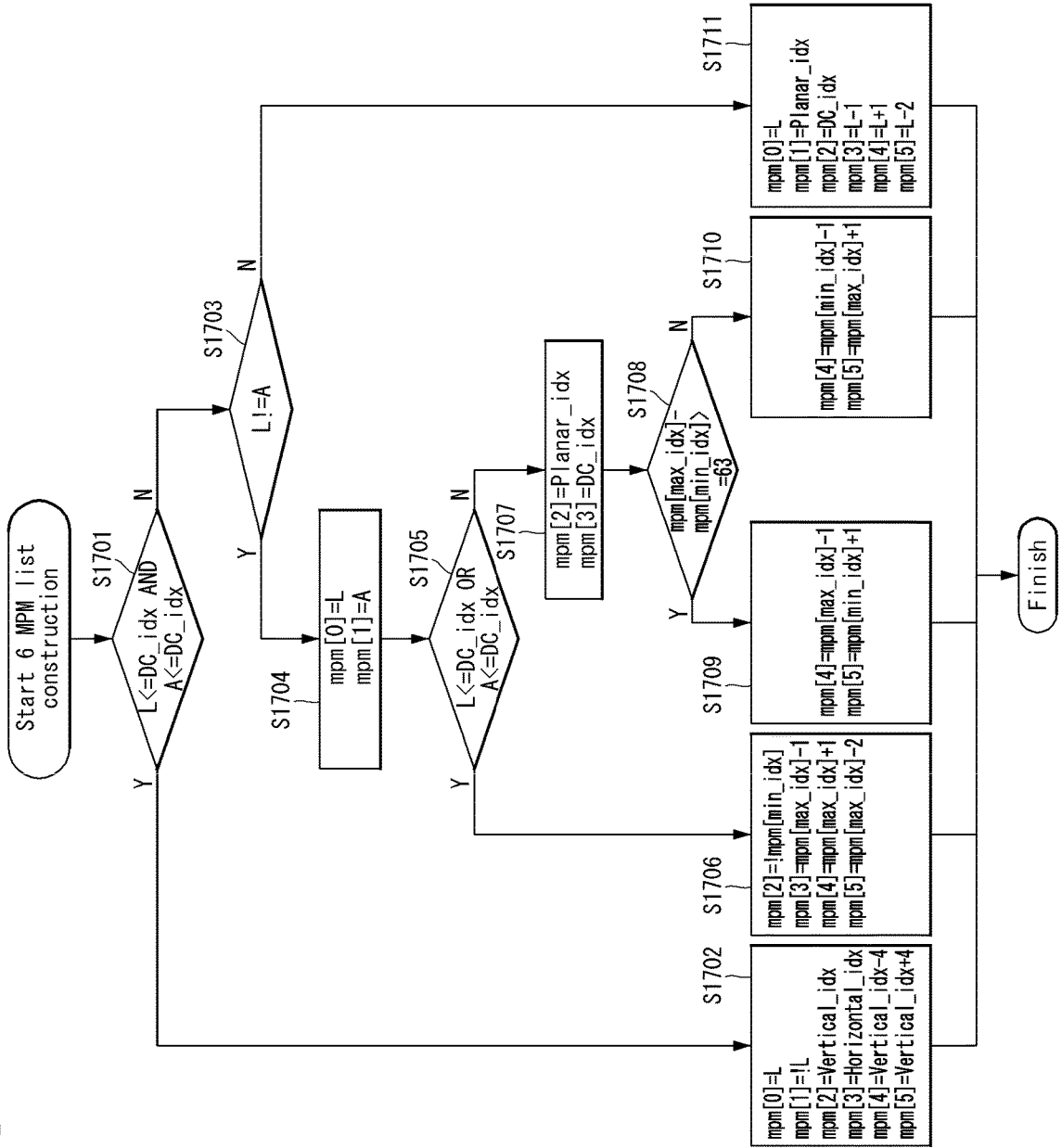
[Fig. 17]

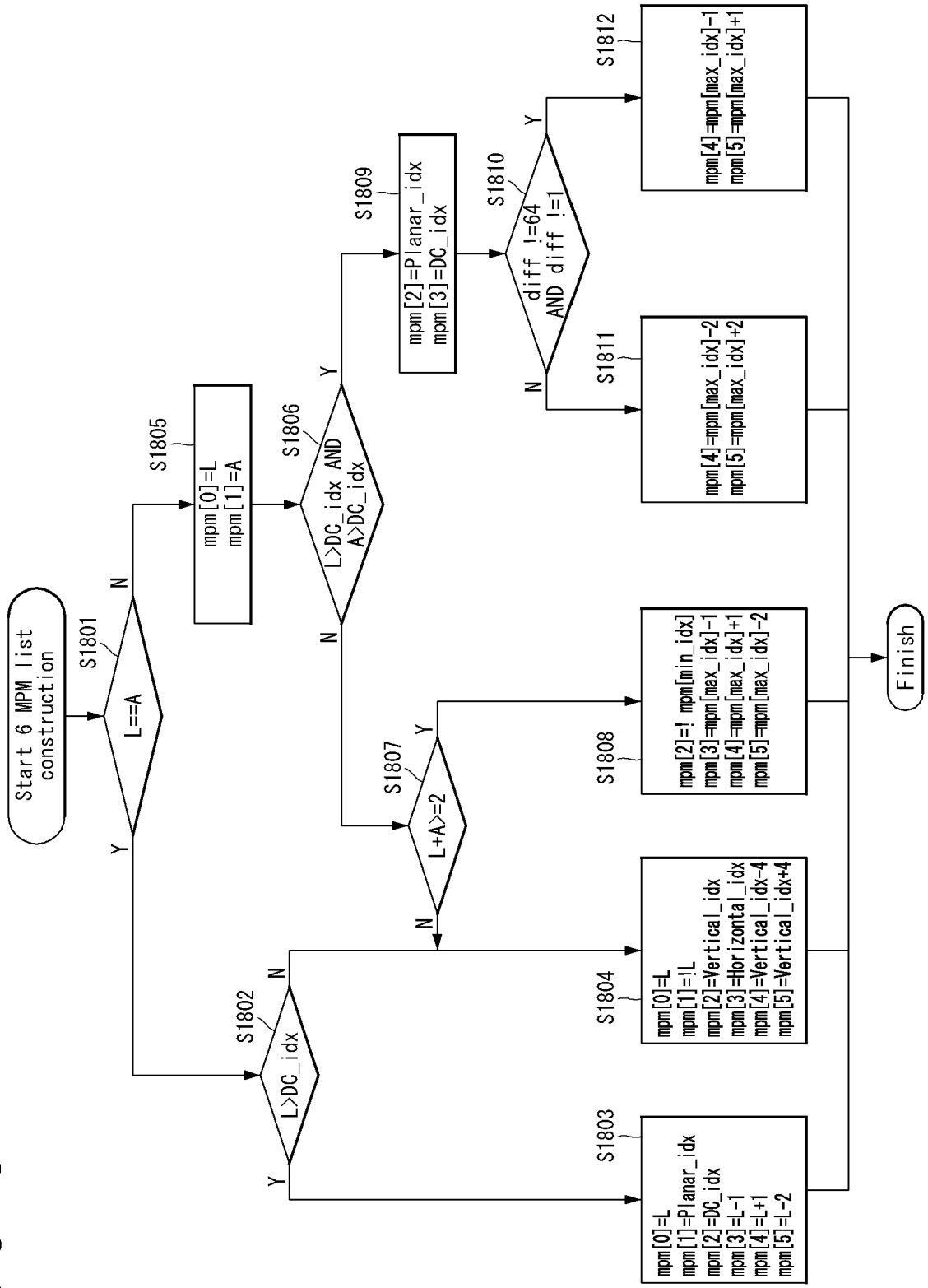
[Fig. 18]

[Fig. 19]
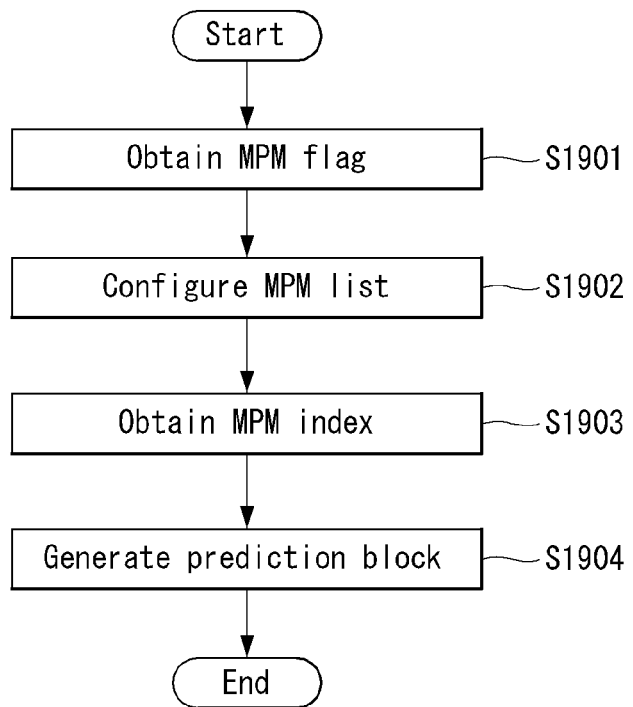
[Fig. 20]
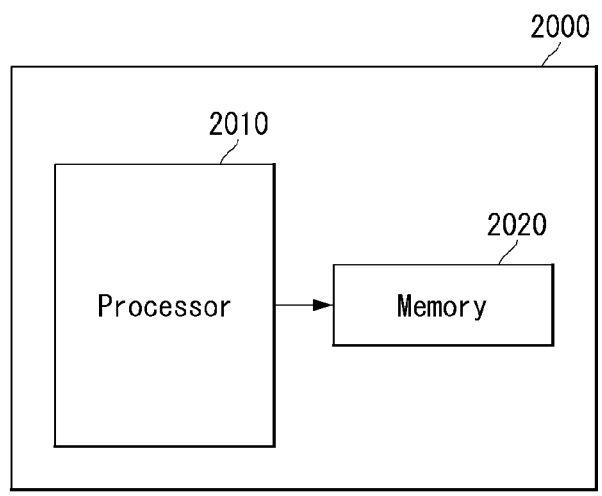

[Fig. 21]
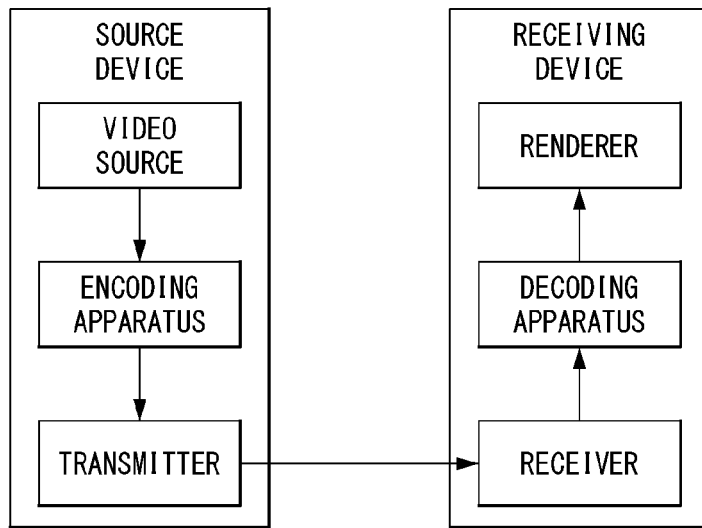
[Fig. 22]
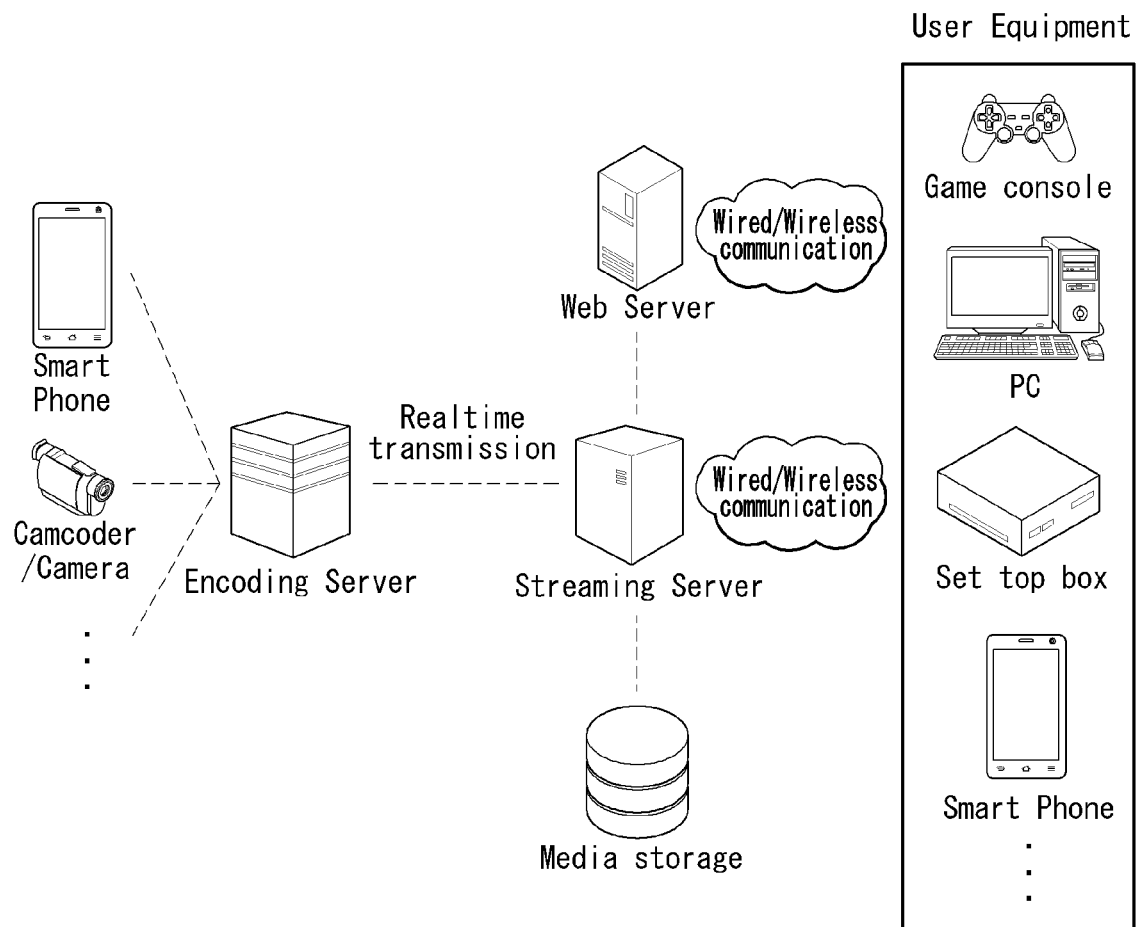

METHOD FOR PROCESSING IMAGE ON BASIS OF INTRA PREDICTION MODE, AND DEVICE THEREFOR

CROSS-REFERENCE TO RELATED APPLICATIONS

This application is the National Stage filing under 35 U.S.C. 371 of International Application No. PCT/KR2019/011824, filed on Sep. 11, 2019, which claims the benefit of U.S. Provisional Applications No. 62/729,981, filed on Sep. 11, 2018 and No. 62/731,104, filed on Sep. 14, 2018, the contents of which are all hereby incorporated by reference herein in their entirety.

TECHNICAL FIELD

The disclosure relates to methods for processing still images or videos, and more particularly, to method for encoding/decoding still images or videos based on an intra prediction mode and devices supporting the same.

BACKGROUND ART

Compression encoding means a series of signal processing techniques for transmitting digitized information through a communication line or techniques for storing information in a form suitable for a storage medium. The medium including a picture, an image, audio, etc. may be a target for compression encoding, and particularly, a technique for performing compression encoding on a picture is referred to as video image compression.

Next-generation video contents are supposed to have the characteristics of high spatial resolution, a high frame rate and high dimensionality of scene representation. In order to process such contents, a drastic increase in the memory storage, memory access rate and processing power will result.

Accordingly, it is required to design a coding tool for processing next-generation video contents efficiently.

DETAILED DESCRIPTION OF THE DISCLOSURE

Technical Problem

When 67 intra prediction modes are used for intra prediction, the MPM list including three MPM candidates which is used in conventional image compression techniques is not sufficient to indicate the increased diversity of intra prediction modes. Further, the MPM list including six MPM candidates which includes pruning check function and the function to search all defined neighboring locations until a predetermined number of MPM candidates (or the length of the MPM list) are met is too high in complexity, which may greatly affect throughput.

Therefore, the disclosure proposes a method for efficiently configuring MPM list for efficient balancing between complexity and coding efficiency so as to mitigate such issues.

Objects of the disclosure are not limited to the foregoing, and other unmentioned objects would be apparent to one of ordinary skill in the art from the following description.

Technical Solution

According to an embodiment of the disclosure, a method for decoding an image based on an intra prediction mode may comprise obtaining a most probable mode (MPM) flag indicating whether an MPM is applied to a current block, the MPM denoting a mode in which an intra prediction mode of the current block is derived from an intra-predicted block around the current block, configuring an MPM list based on whether intra prediction modes of left and upper neighboring blocks of the current block meet predefined conditions when the MPM is applied to the current block, obtaining an MPM index indicating a specific intra prediction mode in the MPM list, and generating a prediction block of the current block using an intra prediction mode specified by the MPM index.

Preferably, the left neighboring block may be set as a block including a pixel horizontally adjacent to a left lower sample in the current block, and the upper neighboring block may be set as a block including a pixel vertically adjacent to an upper right sample in the current block.

Preferably, configuring the MPM list may include configuring one of a specific number of MPM lists based on four pre-defined conditions.

Preferably, configuring the MPM list may include configuring a first MPM list when a first condition is met, configuring a second MPM list when a second condition and a third condition are met but the first condition is not met, configuring a third MPM list when the second condition and a fourth condition are met but the first condition and the third condition are not met, configuring a fourth MPM list when the second condition is met but the first condition, the third condition, and the fourth condition are not met, and configuring a fifth MPM list when the first condition and the second condition are not met.

Preferably, the first condition may be set as whether the intra prediction modes of the left neighboring block and a right neighboring block are smaller than, or equal to, a DC mode, the second condition may be set as whether the intra prediction modes of the left neighboring block and the right neighboring block are not equal to each other, the third condition may be set as whether the intra prediction mode of the left neighboring block or the intra prediction mode of the right neighboring block are smaller than, or equal to, the DC mode, and the fourth condition may be set as whether a difference between a maximum mode indicating a mode with a larger mode index value among the intra prediction modes of the left neighboring block and the right neighboring block and a minimum mode indicating a mode with a smaller mode index value among the intra prediction modes of the left neighboring block and the right neighboring block is smaller than a predefined specific value.

According to another embodiment of the disclosure, a device decoding an image based on an intra prediction mode may comprise a memory storing a video signal, and a processor coupled with the memory. The processor may obtain a most probable mode (MPM) flag indicating whether an MPM is applied to a current block, the MPM denoting a mode in which an intra prediction mode of the current block may be derived from an intra-predicted block around the current block, when the MPM is applied to the current block, configure an MPM list based on whether intra prediction modes of left and upper neighboring blocks of the current block meet predefined conditions, obtain an MPM index indicating a specific intra prediction mode in the MPM list, and generate a prediction block of the current block using an intra prediction mode specified by the MPM index.

Advantageous Effects

According to an embodiment of the disclosure, it is possible to mitigate complexity and increase compression efficiency by efficiently deriving an MPM list according to predefined conditions.

Effects of the disclosure are not limited to the foregoing, and other unmentioned effects would be apparent to one of ordinary skill in the art from the following description.

BRIEF DESCRIPTION OF DRAWINGS

The accompany drawings, which are included as part of the detailed description in order to help understanding of the disclosure, provide embodiments of the disclosure and describe the technical characteristics of the disclosure along with the detailed description.

FIG. 1 illustrates an example of functional elements of an encoder as an example of an apparatus for processing a video signal according to an embodiment of the disclosure.

FIG. 2 is an embodiment to which the disclosure is applied, and is a schematic block diagram of a decoding apparatus in which the decoding of a video/image signal is performed.

FIG. 3 is an embodiment to which the disclosure may be applied, and is a diagram illustrating an example of a multi-type tree structure.

FIG. 4 is an embodiment to which the disclosure may be applied, and is a diagram illustrating the signaling mechanism of partition division information of a quadtree structure with a nested multi-type tree.

FIG. 5 is an embodiment to which the disclosure may be applied, and is a diagram illustrating a method of splitting a CTU into multiple CUs based on a quadtree and nested multi-type tree structure.

FIG. 6 is an embodiment to which the disclosure may be applied, and is a diagram illustrating a method of constraining binary-tree split.

FIG. 7 is an embodiment to which the disclosure may be applied, and is a diagram illustrating redundant split patterns which may occur in a binary tree split and a ternary-tree split.

FIGS. 8 and 9 are diagrams illustrating an intra prediction-based video/image encoding method according to an embodiment of the disclosure and an intra predictor within an encoding apparatus according to an embodiment of the disclosure.

FIGS. 10 and 11 are diagrams illustrating an intra prediction-based video/image decoding method according to an embodiment of the disclosure and an intra predictor within a decoding apparatus according to an embodiment of the disclosure.

FIGS. 12 and 13 are views illustrating prediction directions of intra prediction modes according to an embodiment of the disclosure.

FIG. 14 illustrates an example of neighboring blocks used as an MPM candidate according to an embodiment of the disclosure.

FIG. 15 is a flowchart illustrating a method of configuring an MPM list based on predefined conditions according to an embodiment of the disclosure.

FIG. 16 is a flowchart illustrating a method of configuring an MPM list according to predefined conditions by using a shared list according to an embodiment of the disclosure.

FIG. 17 is a flowchart illustrating a method of configuring an MPM list based on predefined conditions according to an embodiment of the disclosure.

FIG. 18 is a flowchart illustrating a method of configuring an MPM list based on predefined conditions according to an embodiment of the disclosure.

FIG. 19 is a flowchart illustrating a method of generating an intra prediction block according to an embodiment of the disclosure.

FIG. 21 is a block diagram illustrating an example device for processing video signals according to an embodiment of the disclosure. FIG. 18 illustrates a video coding system according to the disclosure.

FIG. 22 is a view illustrating a structure of a content streaming system according to an embodiment of the disclosure.

MODE FOR CARRYING OUT THE DISCLOSURE

Hereinafter, preferred embodiments of the disclosure will be described by reference to the accompanying drawings. The description that will be described below with the accompanying drawings is to describe exemplary embodiments of the disclosure, and is not intended to describe the only embodiment in which the disclosure may be implemented. The description below includes particular details in order to provide perfect understanding of the disclosure. However, it is understood that the disclosure may be embodied without the particular details to those skilled in the art.

In some cases, in order to prevent the technical concept of the disclosure from being unclear, structures or devices which are publicly known may be omitted, or may be depicted as a block diagram centering on the core functions of the structures or the devices.

Further, although general terms widely used currently are selected as the terms in the disclosure as much as possible, a term that is arbitrarily selected by the applicant is used in a specific case. Since the meaning of the term will be clearly described in the corresponding part of the description in such a case, it is understood that the disclosure will not be simply interpreted by the terms only used in the description of the disclosure, but the meaning of the terms should be figured out.

Specific terminologies used in the description below may be provided to help the understanding of the disclosure. Furthermore, the specific terminology may be modified into other forms within the scope of the technical concept of the disclosure. For example, a signal, data, a sample, a picture, a frame, a block, etc may be properly replaced and interpreted in each coding process.

Hereinafter, in this specification, a "processing unit" means a unit in which an encoding/decoding processing process, such as prediction, a transform and/or quantization, is performed. Hereinafter, for convenience of description, a processing unit may also be called a "processing block" or "block."

A processing unit may be construed as having a meaning including a unit for a luma component and a unit for a chroma component. For example, a processing unit may correspond to a coding tree unit (CTU), a coding unit (CU), a prediction unit (PU) or a transform unit (TU).

Furthermore, a processing unit may be construed as being a unit for a luma component or a unit for a chroma component. For example, the processing unit may correspond to a coding tree block (CTB), coding block (CB), prediction block (PB) or transform block (TB) for a luma component. Alternatively, a processing unit may correspond to a coding tree block (CTB), coding block (CB), prediction block (PB) or transform block (TB) for a chroma component. Furthermore, the disclosure is not limited thereto, and a processing unit may be construed as a meaning including a unit for a luma component and a unit for a chroma component.

Furthermore, a processing unit is not essentially limited to a square block and may be constructed in a polygon form having three or more vertices.

Furthermore, hereinafter, in this specification, a pixel, a picture element, etc. are generally called a sample. Furthermore, to use a sample may mean to use a pixel value, a picture element value or the like.

FIG. 1 illustrates an example of functional elements of an encoder as an example of an apparatus for processing a video signal according to an embodiment of the disclosure.

Referring to FIG. 1, an encoding apparatus 100 may be configured to include an image divider 110, a subtractor 115, a transformer 120, a quantizer 130, a dequantizer 140, an inverse transformer 150, an adder 155, a filter 160, a memory 170, an inter predictor 180, an intra predictor 185 and an entropy encoder 190. The inter predictor 180 and the intra predictor 185 may be commonly called a predictor. In other words, the predictor may include the inter predictor 180 and the intra predictor 185. The transformer 120, the quantizer 130, the dequantizer 140, and the inverse transformer 150 may be included in a residual processor. The residual processor may further include the subtractor 115. In one embodiment, the image divider 110, the subtractor 115, the transformer 120, the quantizer 130, the dequantizer 140, the inverse transformer 150, the adder 155, the filter 160, the inter predictor 180, the intra predictor 185 and the entropy encoder 190 may be configured as one hardware component (e.g., an encoder or a processor). Furthermore, the memory 170 may include a decoded picture buffer (DPB), and may be configured with a digital storage medium.

The image divider 110 may divide an input image (or picture or frame), input to the encoding apparatus 100, into one or more processing units. For example, the processing unit may be called a coding unit (CU). In this case, the coding unit may be recursively split from a coding tree unit (CTU) or the largest coding unit (LCU) based on a quadtree binary-tree (QTBT) structure. For example, one coding unit may be split into a plurality of coding units of a deeper depth based on a quadtree structure and/or a binary-tree structure. In this case, for example, the quadtree structure may be first applied, and the binary-tree structure may be then applied. Alternatively the binary-tree structure may be first applied. A coding procedure according to the disclosure may be performed based on the final coding unit that is no longer split. In this case, the largest coding unit may be directly used as the final coding unit based on coding efficiency according to an image characteristic or a coding unit may be recursively split into coding units of a deeper depth, if necessary. Accordingly, a coding unit having an optimal size may be used as the final coding unit. In this case, the coding procedure may include a procedure, such as a prediction, transform or reconstruction to be described later. For another example, the processing unit may further include a prediction unit (PU) or a transform unit (TU). In this case, each of the prediction unit and the transform unit may be divided or partitioned from each final coding unit. The prediction unit may be a unit for sample prediction, and the transform unit may be a unit from which a transform coefficient is derived and/or a unit in which a residual signal is derived from a transform coefficient.

A unit may be interchangeably used with a block or an area according to circumstances. In a common case, an M×N block may indicate a set of samples configured with M columns and N rows or a set of transform coefficients. In general, a sample may indicate a pixel or a value of a pixel, and may indicate only a pixel/pixel value of a luma component or only a pixel/pixel value of a chroma component. In a sample, one picture (or image) may be used as a term corresponding to a pixel or pel.

The encoding apparatus 100 may generate a residual signal (residual block or residual sample array) by subtracting a prediction signal (predicted block or prediction sample array), output by the inter predictor 180 or the intra predictor 185, from an input image signal (original block or original sample array). The generated residual signal is transmitted to the transformer 120. In this case, as illustrated, a unit in which the prediction signal (prediction block or prediction sample array) is subtracted from the input image signal (original block or original sample array) within the encoder 100 may be called the subtractor 115. The predictor may perform prediction on a processing target block (hereinafter referred to as a current block), and may generate a predicted block including prediction samples for the current block. The predictor may determine whether an intra prediction is applied or inter prediction is applied in a current block or a CU unit. The predictor may generate various pieces of information on a prediction, such as prediction mode information as will be described later in the description of each prediction mode, and may transmit the information to the entropy encoder 190. The information on prediction may be encoded in the entropy encoder 190 and may be output in a bitstream form.

The intra predictor 185 may predict a current block with reference to samples within a current picture. The referred samples may be located to neighbor the current block or may be spaced from the current block depending on a prediction mode. In an intra prediction, prediction modes may include a plurality of non-angular modes and a plurality of angular modes. The non-angular mode may include a DC mode and a planar mode, for example. The angular mode may include 33 angular prediction modes or 65 angular prediction modes, for example, depending on a fine degree of a prediction direction. In this case, angular prediction modes that are more or less than the 33 angular prediction modes or 65 angular prediction modes may be used depending on a configuration, for example. The intra predictor 185 may determine a prediction mode applied to a current block using the prediction mode applied to a neighboring block.

The inter predictor 180 may derive a predicted block for a current block based on a reference block (reference sample array) specified by a motion vector on a reference picture. In this case, in order to reduce the amount of motion information transmitted in an inter prediction mode, motion information may be predicted as a block, a sub-block or a sample unit based on the correlation of motion information between a neighboring block and the current block. The motion information may include a motion vector and a reference picture index. The motion information may further include inter prediction direction (L0 prediction, L1 prediction, Bi prediction) information. In the case of inter prediction, a neighboring block may include a spatial neighboring block within a current picture and a temporal neighboring block within a reference picture. A reference picture including a reference block and a reference picture including a temporal neighboring block may be the same or different. The temporal neighboring block may be referred to as a name called a co-located reference block or a co-located CU (colCU). A reference picture including a temporal neighboring block may be referred to as a co-located picture (colPic). For example, the inter predictor 180 may construct a motion information candidate list based on neighboring blocks, and may generate information indicating that which candidate is used to derive a motion vector and/or reference picture index of a current block. An inter prediction may be performed based on various prediction modes. For example, in the case of a skip mode and a merge mode, the inter predictor 180 may use motion information of a neighboring block as motion information of a current block. In the case of the skip mode, unlike the merge mode, a residual signal may not be transmitted. In the case of a motion information prediction (MVP) mode, a motion vector of a neighboring block may be used as a motion vector predictor. A motion vector of a current block may be indicated by signaling a motion vector difference.

A prediction signal generated through the inter predictor 180 or the intra predictor 185 may be used to generate a reconstructed signal or a residual signal.

The transformer 120 may generate transform coefficients by applying a transform scheme to a residual signal. For example, the transform scheme may include at least one of a discrete cosine transform (DCT), a discrete sine transform (DST), a Karhunen-Loève transform (KLT), a graph-based transform (GBT), or a conditionally non-linear transform (CNT). In this case, the GBT means a transform obtained from a graph if relation information between pixels is represented as the graph. The CNT means a transform obtained based on a prediction signal generated u sing all of previously reconstructed pixels. Furthermore, a transform process may be applied to pixel blocks having the same size of a square form or may be applied to blocks having variable sizes not a square form.

The quantizer 130 may quantize transform coefficients and transmit them to the entropy encoder 190. The entropy encoder 190 may encode a quantized signal (information on quantized transform coefficients) and output it in a bitstream form. The information on quantized transform coefficients may be called residual information. The quantizer 130 may re-arrange the quantized transform coefficients of a block form in one-dimensional vector form based on a coefficient scan sequence, and may generate information on the quantized transform coefficients based on the quantized transform coefficients of the one-dimensional vector form. The entropy encoder 190 may perform various encoding methods, such as exponential Golomb, context-adaptive variable length coding (CAVLC), and context-adaptive binary arithmetic coding (CABAC). The entropy encoder 190 may encode information (e.g., values of syntax elements) necessary for video/image reconstruction in addition to the quantized transform coefficients together or separately. The encoded information (e.g., encoded video/image information) may be transmitted or stored in a network abstraction layer (NAL) unit in the form of a bitstream. The bitstream may be transmitted over a network or may be stored in a digital storage medium. In this case, the network may include a broadcast network and/or a communication network. The digital storage medium may include various storage media, such as a USB, an SD, a CD, a DVD, Blu-ray, an HDD, and an SSD. A transmitter (not illustrated) that transmits a signal output by the entropy encoder 190 and/or a storage (not illustrated) for storing the signal may be configured as an internal/external element of the encoding apparatus 100, or the transmitter may be an element of the entropy encoder 190.

Quantized transform coefficients output by the quantizer 130 may be used to generate a prediction signal. For example, a residual signal may be reconstructed by applying de-quantization and an inverse transform to the quantized transform coefficients through the dequantizer 140 and the inverse transformer 150 within a loop. The adder 155 may add the reconstructed residual signal to a prediction signal output by the inter predictor 180 or the intra predictor 185, so a reconstructed signal (reconstructed picture, reconstructed block or reconstructed sample array) may be generated. A predicted block may be used as a reconstructed block if there is no residual for a processing target block as in the case where a skip mode has been applied. The adder 155 may be called a reconstructor or a reconstruction block generator. The generated reconstructed signal may be used for the intra prediction of a next processing target block within a current picture, and may be used for the inter prediction of a next picture through filtering as will be described later.

The filter 160 can improve subjective/objective picture quality by applying filtering to a reconstructed signal. For example, the filter 160 may generate a modified reconstructed picture by applying various filtering methods to the reconstructed picture. The modified reconstructed picture may be stored in the memory 170, specifically, the DPB of the memory 170. The various filtering methods may include deblocking filtering, a sample adaptive offset, an adaptive loop filter, and a bilateral filter, for example. The filter 160 may generate various pieces of information for filtering as will be described later in the description of each filtering method, and may transmit them to the entropy encoder 190. The filtering information may be encoded by the entropy encoder 190 and output in a bitstream form.

The modified reconstructed picture transmitted to the memory 170 may be used as a reference picture in the inter predictor 180. The encoding apparatus can avoid a prediction mismatch in the encoding apparatus 100 and a decoding apparatus and improve encoding efficiency if inter prediction is applied.

The DPB of the memory 170 may store a modified reconstructed picture in order to use the modified reconstructed picture as a reference picture in the inter predictor 180. The memory 170 may store motion information of a block from which motion information within a current picture has been derived (or encoded) and/or motion information of blocks within an already reconstructed picture. The stored motion information may be transmitted to the inter predictor 180 in order to be used as motion information of a spatial neighboring block or motion information of a temporal neighboring block. The memory 170 may store reconstructed samples of reconstructed blocks within a current picture and may transmit them to the intra predictor 185.

FIG. 2 is an embodiment to which the disclosure is applied, and is a schematic block diagram of a decoding apparatus in which the decoding of a video/image signal is performed.

Referring to FIG. 2, the decoding apparatus 200 may be configured to include an entropy decoder 210, a dequantizer 220, an inverse transformer 230, an adder 235, a filter 240, a memory 250, an inter predictor 260 and an intra predictor 265. The inter predictor 260 and the intra predictor 265 may be collectively called a predictor. That is, the predictor may include the inter predictor 180 and the intra predictor 185. The dequantizer 220 and the inverse transformer 230 may be collectively called as residual processor. That is, the residual processor may include the dequantizer 220 and the inverse transformer 230. The entropy decoder 210, the dequantizer 220, the inverse transformer 230, the adder 235, the filter 240, the inter predictor 260 and the intra predictor 265 may be configured as one hardware component (e.g., the decoder or the processor) according to an embodiment. Furthermore, the memory 170 may include a decoded picture buffer (DPB), and may be configured with a digital storage medium.

When a bitstream including video/image information is input, the decoding apparatus 200 may reconstruct an image in accordance with a process of processing video/image information in the encoding apparatus of FIG. 1. For example, the decoding apparatus 200 may perform decoding using a processing unit applied in the encoding apparatus. Accordingly, a processing unit for decoding may be a coding unit, for example. The coding unit may be split from a coding tree unit or the largest coding unit depending on a quadtree structure and/or a binary-tree structure. Furthermore, a reconstructed image signal decoded and output through the decoding apparatus 200 may be played back through a playback device.

The decoding apparatus 200 may receive a signal, output by the encoding apparatus of FIG. 1, in a bitstream form. The received signal may be decoded through the entropy decoder 210. For example, the entropy decoder 210 may derive information (e.g., video/image information) for image reconstruction (or picture reconstruction) by parsing the bitstream. For example, the entropy decoder 210 may decode information within the bitstream based on a coding method, such as exponential Golomb encoding, CAVLC or CABAC, and may output a value of a syntax element for image reconstruction or quantized values of transform coefficients regarding a residual. More specifically, in the CABAC entropy decoding method, a bin corresponding to each syntax element may be received from a bitstream, a context model may be determined using decoding target syntax element information and decoding information of a neighboring and decoding target block or information of a symbol/bin decoded in a previous step, a probability that a bin occurs may be predicted based on the determined context model, and a symbol corresponding to a value of each syntax element may be generated by performing arithmetic decoding on the bin. In this case, in the CABAC entropy decoding method, after a context model is determined, the context model may be updated using information of a symbol/bin decoded for the context model of a next symbol/bin. Information on a prediction among information decoded in the entropy decoder 2110 may be provided to the predictor (inter predictor 260 and intra predictor 265). Parameter information related to a residual value on which entropy decoding has been performed in the entropy decoder 210, that is, quantized transform coefficients, may be input to the dequantizer 220. Furthermore, information on filtering among information decoded in the entropy decoder 210 may be provided to the filter 240. Meanwhile, a receiver (not illustrated) that receives a signal output by the encoding apparatus may be further configured as an internal/external element of the decoding apparatus 200 or the receiver may be an element of the entropy decoder 210.

The dequantizer 220 may de-quantize quantized transform coefficients and output transform coefficients. The dequantizer 220 may re-arrange the quantized transform coefficients in a two-dimensional block form. In this case, the re-arrangement may be performed based on a coefficient scan sequence performed in the encoding apparatus. The dequantizer 220 may perform de-quantization on the quantized transform coefficients using a quantization parameter (e.g., quantization step size information), and may obtain transform coefficients.

The inverse transformer 230 obtains a residual signal (residual block or residual sample array) by inverse-transforming transform coefficients.

The predictor may perform a prediction on a current block, and may generate a predicted block including prediction samples for the current block. The predictor may determine whether an intra prediction is applied or inter prediction is applied to the current block based on information on a prediction, which is output by the entropy decoder 210, and may determine a detailed intra/inter prediction mode.

The intra predictor 265 may predict a current block with reference to samples within a current picture. The referred samples may be located to neighbor a current block or may be spaced apart from a current block depending on a prediction mode. In an intra prediction, prediction modes may include a plurality of non-angular modes and a plurality of angular modes. The intra predictor 265 may determine a prediction mode applied to a current block using a prediction mode applied to a neighboring block.

The inter predictor 260 may derive a predicted block for a current block based on a reference block (reference sample array) specified by a motion vector on a reference picture. In this case, in order to reduce the amount of motion information transmitted in an inter prediction mode, motion information may be predicted as a block, a sub-block or a sample unit based on the correlation of motion information between a neighboring block and the current block. The motion information may include a motion vector and a reference picture index. The motion information may further include inter prediction direction (L0 prediction, L1 prediction, Bi prediction) information. In the case of inter prediction, a neighboring block may include a spatial neighboring block within a current picture and a temporal neighboring block within a reference picture. For example, the inter predictor 260 may configure a motion information candidate list based on neighboring blocks, and may derive a motion vector and/or reference picture index of a current block based on received candidate selection information. An inter prediction may be performed based on various prediction modes. Information on the prediction may include information indicating a mode of inter prediction for a current block.

The adder 235 may generate a reconstructed signal (reconstructed picture, reconstructed block or reconstructed sample array) by adding an obtained residual signal to a prediction signal (predicted block or prediction sample array) output by the inter predictor 260 or the intra predictor 265. A predicted block may be used as a reconstructed block if there is no residual for a processing target block as in the case where a skip mode has been applied.

The adder 235 may be called a reconstructor or a reconstruction block generator. The generated reconstructed signal may be used for the intra prediction of a next processing target block within a current picture, and may be used for the inter prediction of a next picture through filtering as will be described later.

The filter 240 can improve subjective/objective picture quality by applying filtering to a reconstructed signal. For example, the filter 240 may generate a modified reconstructed picture by applying various filtering methods to a reconstructed picture, and may transmit the modified reconstructed picture to the memory 250, specifically, the DPB of the memory 250. The various filtering methods may include deblocking filtering, a sample adaptive offset, an adaptive loop filter, and a bilateral filter, for example.

A reconstructed picture stored (modified) in the DPB of the memory 250 may be used as a reference picture in the inter predictor 260. The memory 250 may store motion information of a block from which motion information within a current picture has been derived (or decoded) and/or motion information of blocks within an already reconstructed picture. The stored motion information may be transmitted to the inter predictor 260 in order to be used as motion information of a spatial neighboring block or motion information of a temporal neighboring block. The memory 170 may store the reconstructed samples of reconstructed blocks within a current picture, and may transmit them to the intra predictor 265.

In the disclosure, the embodiments described in the filter 160, inter predictor 180 and intra predictor 185 of the encoding apparatus 100 may be applied to the filter 240, inter predictor 260 and intra predictor 265 of the decoding apparatus 200, respectively, identically or in a correspondence manner Block Partitioning A video/image coding method according to this document may be performed based on various detailed technologies. Each of the detailed technologies is schematically described as follows. It is evident to those skilled in that art that the following technologies may be associated with related procedures, such as a prediction, residual processing ((inverse) transform, (de)quantization), syntax element coding, filtering, and partitioning/division in a video/image encoding/decoding procedure that has been described and/or will be described later.

A block partitioning procedure according to this document may be performed in the image divider 110 of the encoding apparatus. Partitioning-related information may be (encoded) processed in the entropy encoder 190 and transmitted to the decoding apparatus in a bitstream form. The entropy decoder 210 of the decoding apparatus may derive the block partitioning structure of a current picture based on the partitioning-related information obtained from the bitstream, and may perform a series of procedures (e.g., prediction, residual processing, block reconstruction and in-loop filtering) based on the block partitioning structure.

Partitioning of Picture into CTUs

Pictures may be partitioned into a sequence of coding tree units (CTUs). A CTU may correspond to a coding tree block (CTB). Alternatively, a CTU may include a coding tree block of luma samples and two coding tree blocks of corresponding chroma samples. In other words, with respect to a picture including three sample arrays, a CTU may include an N×N block of luma samples and two correspondence blocks of chroma samples.

A maximum allowed size of a CTU for coding and prediction may be different from a maximum allowed size of a CTU for a transform. For example, a maximum allowed size of a luma block within a CTU may be 128×128.

Partitioning of CTUs Using a Tree Structure

A CTU may be partitioned based on a quadtree (QT) structure. A quadtree structure may be called a quaternary tree structure. This is for incorporating various local characteristics. Meanwhile, in this document, a CTU may be partitioned based on multi-type tree structure division including a binary-tree (BT) and a ternary-tree (TT) in addition to a quadtree. Hereinafter, a QTBT structure may include a quadtree and binary-tree-based splitting structure. A QTBTTT may include a quadtree, binary-tree and ternary-tree-based splitting structure. Alternatively, a QTBT structure may include a quadtree, binary-tree and ternary-tree-based splitting structure. In a coding tree structure, a CU may have a square shape or a rectangular shape. A CTU may be partitioned as a quadtree structure. Thereafter, the leaf nodes of a quadtree structure may be additionally partitioned by a multi-type tree structure.

FIG. 3 is an embodiment to which the disclosure may be applied, and is a diagram illustrating an example of a multi-type tree structure.

In an embodiment of the disclosure, a multi-type tree structure may include 4 split types, such as that illustrated in FIG. 3. The 4 split types may include vertical binary splitting SPLIT_BT_VER, horizontal binary splitting SPLIT_BT_HOR, vertical ternary splitting SPLIT_TT_VER, and horizontal ternary splitting SPLIT_TT_HOR. The leaf nodes of the multi-type tree structure may be called CUs. Such CUs may be used for a prediction and transform procedure. In this document, in general, a CU, a PU, or a TU may have the same block size. In this case, if a maximum supported transform length is smaller than the width or height of a colour component of a CU, the CU and TU may have different block sizes.

FIG. 4 is an embodiment to which the disclosure may be applied, and is a diagram illustrating the signaling mechanism of partition division information of a quadtree structure with a nested multi-type tree.

In this case, a CTU is treated as the root of a quadtree, and is first partitioned as a quadtree structure. Each quadtree leaf node may be further partitioned into a multi-type tree structure. In the multi-type tree structure, a first flag (e.g., mtt_split_cu_flag) is signaled to indicate whether a corresponding node is additionally partitioned. If the corresponding node is additionally partitioned, a second flag (e.g., mtt_split_cu_verticla_flag) may be signaled to indicate a splitting direction. Thereafter, a third flag (e.g., mtt_split_cu_binary_flag) may be signaled to indicate whether a split type is binary splitting or ternary splitting. For example, a multi-type tree split mode (MttSplitMode) of a CU may be derived like Table 1 based on the mtt_split_cu_vertical_flag and the mtt_split_cu_binary_flag.

TABLE 1

| MttSplitMode | mtt_split_cu_vertical_flag | mtt_split_cu_binary_flag |
|---|---|---|
| SPLIT_TT_HOR | 0 | 0 |
| SPLIT_BT_HOR | 0 | 1 |
| SPLIT_TT_VER | 1 | 0 |
| SPLIT_BT_VER | 1 | 1 |

FIG. 5 is an embodiment to which the disclosure may be applied, and is a diagram illustrating a method of splitting a CTU into multiple CUs based on a quadtree and nested multi-type tree structure.

In this case, bold block edges indicate quadtree partitioning, and the remaining edges indicate multi-type tree partitioning. A quadtree partition with the multi-type tree may provide a content-adapted coding tree structure. A CU may correspond to a coding block (CB). Alternatively, a CU may include a coding block of luma samples and two coding blocks of corresponding chroma samples. The size of a CU may be greater as much as a CTU or may be small as much as 4×4 in a luma sample unit. For example, in the case of a 4:2:0 color format (or chroma format), a maximum chroma CB size may be 64×64, and a minimum chroma CB size may be 2×2.

In this document, for example, a maximum allowed luma TB size may be 64×64, and a maximum allowed chroma TB size may be 32×32. If the width or height of a CB split based on a tree structure is larger than a maximum transform width or height, the corresponding CB may be split until a TB size constraint in a horizontal and vertical direction is satisfied automatically (or implicitly).

Meanwhile, for a quadtree coding tree scheme with a multi-type tree, the following parameters may be defined and identified as SPS syntax elements.

CTU size: the root node size of a quaternary tree

MinQTSize: the minimum allowed quaternary tree leaf node size

MaxBtSize: the maximum allowed binary tree root node size

MaxTtSize: the maximum allowed ternary tree root node size

MaxMttDepth: the maximum allowed hierarchy depth of multi-type tree splitting from a quadtree leaf MinBtSize: the minimum allowed binary tree leaf node size MinTtSize: the minimum allowed ternary tree leaf node size For example, in the case of a quadtree coding tree structure with a multi-type tree, a CTU size may be set to 128×128 luma samples and 64×64 blocks of two corresponding chroma samples (in a 4:2:0 chroma format). In this case, MinOTSize may be set to 16×16, MaxBtSize may be set to 128×128, MaxTtSzie may be set to 64×64, and MinBtSize and MinTtSize (for both width and height) may be set to 4×4, and MaxMttDepth may be set to 4. Quadtree partitioning may be applied to a CTU to generate quadtree leaf nodes. A quadtree leaf node may be called a leaf QT node. Quadtree leaf nodes may have a 16×16 size (i.e., MinOTSize) to a 128×128 size (i.e., CTU size). If a leaf QT node is 128×128, it may not be additionally split into a binary-tree/ternary-tree. The reason for this is that although the leaf QT node is spit, it exceeds MaxBtsize and MaxTtszie (i.e., 64×64). In other cases, the leaf QT node may be additionally split into a multi-type tree. Accordingly, the leaf QT node is a root node for a multi-type tree, and the leaf QT node may have a multi-type tree depth (mttDepth) value of 0. If a multi-type tree depth reaches MaxMttdepth (e.g., 4), additional splitting may be no longer considered. If the width of a multi-type tree node is equal to MinBtSize and is smaller than or equal to 2×MinTtSize, additional horizontal splitting may be no longer considered. If the height of a multi-type tree node is equal to MinBtSize and is smaller than or equal to 2×MinTtSize, additional vertical division may be no longer considered.

FIG. 6 is an embodiment to which the disclosure may be applied, and is a diagram illustrating a method of constraining binary-tree split.

Referring to FIG. 6, in order to allow a 64×64 luma block and 32×32 chroma pipeline design in a hardware decoder, TT splitting may be restricted in a specific case. For example, if the width or height of a luma coding block is larger than a preset specific value (e.g., 32, 64), TT splitting may be restricted as illustrated FIG. 6.

In this document, a coding tree scheme may support that a luma and chroma block has a separate block tree structure. With respect to P and B slices, luma and chroma CTBs within one CTU may be restricted to have the same coding tree structure. However, with respect to I slices, luma and chroma blocks may have separate block tree structures. If a separate block tree mode is applied, a luma CTB may be split into CUs based on a specific coding tree structure. A chroma CTB may be split into chroma CUs based on a different coding tree structure. This may mean that a CU within an I slice may be configured with a coding block of a luma component or coding blocks of two chroma components and a CU within a P or B slice may be configured with blocks of three color components.

In the "Partitioning of the CTUs using a tree structure", a quadtree coding tree structure with a multi-type tree has been described, but a structure in which a CU is split is not limited thereto. For example, a BT structure and a TT structure may be interpreted as a concept included in a multiple partitioning tree (MPT) structure, and a CU may be interpreted as being split through a QT structure and an MPT structure. In one example in which a CU is split through a QT structure and an MPT structure, a partitioning structure may be determined by signaling a syntax element (e.g., MPT_split_type), including information indicating that the leaf node of a QT structure is split into how many blocks, and a syntax element (e.g., MPT_split_mode) including information indicating that the leaf node of a QT structure is split in which one of vertical and horizontal directions.

In another example, a CU may be split using a method different from that of a QT structure, a BT structure or a TT structure. That is, unlike in the case where a CU of a deeper depth is split as the ¼ size of a CU of a shallower depth based on a QT structure, or a CU of a deeper depth is split as the ½ size of a CU of a shallower depth based on a BT structure, or a CU of a deeper depth is split as the ¼ or ½ size of a CU of a shallower depth based on a TT structure, a CU of a deeper depth may be split as the ⅕, ⅓, ⅜, ⅗, ⅔ or ⅝ size of a CU of a shallower depth. A method of splitting a CU is not limited thereto.

If a portion of a tree node block exceeds a bottom or right picture boundary, the corresponding tree node block may be restricted so that all the samples of all coded CUs are located within the picture boundaries. In this case, for example, the following division rule may be applied.

If a portion of a tree node block exceeds both the bottom and the right picture boundaries, If the block is a QT node and the size of the block is larger than the minimum QT size, the block is forced to be split with QT split mode.

Otherwise, the block is forced to be split with SPLIT_BT_HOR mode.

Otherwise if a portion of a tree node block exceeds the bottom picture boundaries, If the block is a QT node, and the size of the block is larger than the minimum QT size, and the size of the block is larger than the maximum BT size, the block is forced to be split with QT split mode.

Otherwise, if the block is a QT node, and the size of the block is larger than the minimum QT size and the size of the block is smaller than or equal to the maximum BT size, the block is forced to be split with QT split mode or SPLIT_BT_HOR mode.

Otherwise (the block is a BTT node or the size of the block is smaller than or equal to the minimum QT size), the block is forced to be split with SPLIT_BT_HOR mode.

Otherwise if a portion of a tree node block exceeds the right picture boundaries, If the block is a QT node, and the size of the block is larger than the minimum QT size, and the size of the block is larger than the maximum BT size, the block is forced to be split with QT split mode.

Otherwise, if the block is a QT node, and the size of the block is larger than the minimum QT size and the size of the block is smaller than or equal to the maximum BT size, the block is forced to be split with QT split mode or SPLIT_BT_VER mode.

Otherwise (the block is a BTT node or the size of the block is smaller than or equal to the minimum QT size), the block is forced to be split with SPLIT_BT_VER mode.

Meanwhile, a quadtree coding block structure with a multi-type tree may provide a very flexible block partitioning structure. Due to split types supported by the multi-type tree, the same coding block structure result may be potentially obtained depending on different split patterns. The amount of data of partitioning information can be reduced by constraining the occurrence of such redundant split patterns. This is described with reference to the following drawing.

FIG. 7 is an embodiment to which the disclosure may be applied, and is a diagram illustrating redundant split patterns which may occur in a binary tree split and a ternary-tree split.

As illustrated in FIG. 7, two levels of consecutive binary splits in one direction has the same coding block structure as a binary split for a center partition after a ternary split. In such a case, a binary tree split (in a given direction) for the center partition of the ternary-tree split may be restricted. Such a constraint may be applied to the CUs of all pictures. If such a specific split is constrained, the signaling of corresponding syntax elements may be modified by incorporating such a constraint case. Accordingly, the number of bits signaled for partitioning can be reduced. For example, as in an example illustrated in FIG. 7, if a binary tree split for the center partition of a CU is constrained, a mtt_split_cu_binary_flag syntax element indicating whether a split is a binary split or a ternary split is not signaled, and a corresponding value may be reasoned as 0 by a decoder.

Prediction

In order to reconstruct a current processing unit in which decoding is performed, a decoded portion of a current picture or other pictures including the current processing unit may be used.

A picture (slice) using only a current picture for reconstruction, that is, on which only an intra-frame prediction is performed may be called an intra picture or I picture (slice). A picture (slice) using a maximum of one motion vector and reference index in order to predict each unit may be called a predictive picture or a P picture (slice). A picture (slice) using a maximum of two motion vectors and reference indices may be called a Bi-predictive picture or a B picture (slice).

An inter prediction means a prediction method of deriving a current processing block based on a data element (e.g., sample value or motion vector) of a picture other than a current picture. That is, the method means a method of predicting a pixel value of a current processing block with reference to reconstructed areas within another reconstructed picture other than a current picture.

Hereinafter, intra prediction is described more specifically.

Intra Prediction (or In-Screen Prediction)

Intra prediction refers to a prediction method of deriving the current processing block from the data elements (e.g., sample value) of the same decoded picture (or slice). That is, intra prediction refers to a method of predicting the pixel value of the current processing block by referring to reconstructed regions in the current picture.

Intra prediction may represent prediction that generates a prediction sample for the current block based on a reference sample outside the current block in the picture to which the current block belongs (hereinafter, referred to as the current picture).

The disclosure describes a detailed technology of the intra prediction method described in connection with FIGS. 1 and 2 above, and in the case of a decoder, it may be represented as an intra prediction-based video/image decoding method of FIG. 10 and an intra prediction unit in the decoding device of FIG. 11. Further, the encoder may be represented as an intra prediction-based video/image encoding method of FIG. 8 and the intra prediction unit in the encoding device of FIG. 9, as described below. Further, the data encoded by FIGS. 8 and 9 may be stored in the form of a bitstream.

When intra prediction is applied to the current block, neighboring reference samples to be used for intra prediction of the current block may be derived. The neighboring reference samples of the current block may include a sample adjacent to the left boundary of the current block with a size of nW×nH, a total of 2×nH samples adjacent to the bottom-left side of the current block, a sample adjacent to the top boundary of the current block, a total of 2×nW samples adjacent to the top-right side of the current block, and one sample adjacent to the top-left side of the current block. Alternatively, the neighboring reference samples of the current block may include a plurality of columns of upper neighboring samples and a plurality of rows of left neighboring samples. Further, the neighboring reference samples of the current block may include a total of nH samples adjacent to the right boundary of the current block with a size of nW×nH, a total of nW samples adjacent to the bottom boundary of the current block, and one sample adjacent to the bottom-right side of the current block.

However, some of the neighboring reference samples of the current block have not yet been decoded or may not be available. In this case, the decoder may configure neighboring reference samples to be used for prediction by substituting available samples for the unavailable samples. Alternatively, the decoder may configure the neighboring reference samples to be used for prediction via interpolation of available samples.

When neighboring reference samples are derived, prediction samples may be derived i) based on an average or interpolation of the neighboring reference samples of the current block, and (ii) based on a reference sample present in a specific (prediction) direction for the prediction sample among the neighboring reference samples of the current block. Case (i) may be referred to as a non-directional mode or a non-angular mode, and case (ii) as a directional mode or an angular mode. Further, the prediction sample may also be generated via interpolation between a first neighboring sample and the second neighboring sample positioned in the opposite direction of the prediction direction of the intra prediction mode of the current block with respect to the prediction sample of the current block among the neighboring reference samples. The above-described case may be referred to as linear interpolation intra prediction (LIP). Further, a temporary prediction sample of the current block may be derived based on the filtered neighboring reference samples, and the prediction sample of the current block may be derived by weighted-summing the temporary prediction sample and at least one reference sample derived according to the intra prediction mode among the existing neighboring reference samples, i.e., non-filtered neighboring reference samples. The above-described case may be referred to as position dependent intra prediction (PDPC). Meanwhile, post-filtering may be performed on the derived prediction samples as necessary.

Specifically, the intra prediction procedure may include an intra prediction mode determination step, a neighbor reference sample derivation step, and an intra prediction mode-based prediction sample derivation step. Further, a post-filtering step may be performed on the derived prediction sample as necessary.

Substantially, the following may be included in the video/image encoding procedure based on intra prediction and the intra prediction unit in the encoding device.

FIGS. 8 and 9 are views illustrating a video/image encoding method and an intra prediction unit in an encoding device based on intra prediction according to an embodiment of the disclosure.

Referring to FIGS. 8 and 9, S801 may be performed by the intra prediction unit 185 of the encoding device, and S802 may be performed by the residual processing unit of the encoding device. Specifically, S802 may be performed by the subtraction unit 115 of the encoding device. In S803, prediction information may be derived by the intra prediction unit 185 and may be encoded by the entropy encoding unit 190. In S803, residual information may be derived by the residual processing unit and may be encoded by the entropy encoding unit 190. The residual information is information for the residual samples. The residual information may include information for quantized transform coefficients for the residual samples.

As described above, the residual samples may be derived as transform coefficients through the transform unit 120 of the encoding device, and the transform coefficients may be derived as quantized transform coefficients through the quantization unit 130. Information for the quantized transform coefficients may be encoded by the entropy encoding unit 190 through a residual coding procedure.

The encoding device performs intra prediction on the current block (S801). The encoding device may derive an intra prediction mode for the current block, derive neighboring reference samples of the current block, and generate prediction samples in the current block based on the intra prediction mode and the neighboring reference samples. Here, the intra prediction mode determination and the derivation of the neighboring reference samples may be performed simultaneously or one before the other. For example, the intra prediction unit 185 of the encoding device may include a prediction mode determination unit 186, a reference sample derivation unit 187, and a prediction sample derivation unit 188. The prediction mode determination unit 186 may determine the intra prediction mode for the current block. The reference sample derivation unit 187 may derive neighboring reference samples of the current block, and the prediction sample derivation unit 188 may derive motion samples of the current block. Meanwhile, although not shown, when a prediction sample filtering procedure described below is performed, the intra prediction unit 185 may further include a prediction sample filter unit (not shown). The encoding device may determine a mode applied to the current block from among a plurality of intra prediction modes. The encoding device may compare RD costs for the intra prediction modes and determine an optimal intra prediction mode for the current block.

Meanwhile, the encoding device may perform a prediction sample filtering procedure. Prediction sample filtering may be referred to as post filtering. Some or all of the prediction samples may be filtered by the prediction sample filtering procedure. In some cases, the prediction sample filtering procedure may be omitted.

The encoding device generates residual samples for the current block based on the (filtered) prediction sample (S802). The encoding device may encode image information including prediction mode information indicating the intra prediction mode and residual information for the residual samples (S803). The encoded image information may be output in the form of a bitstream. The output bitstream may be delivered to a decoding device through a storage medium or a network.

Meanwhile, as set forth above, the encoding device may generate a reconstructed picture (including reconstructed samples and reconstructed block) based on the reference samples and the residual samples. This is for the encoding device to derive the same prediction result as that obtained by the decoding device and coding efficiency may be raised thereby. In-loop filtering may further be performed on the reconstructed picture as described above.

FIGS. 10 and 11 are views illustrating a video/image decoding method and an intra prediction unit in a decoding device based on intra prediction according to an embodiment of the disclosure.

Referring to FIGS. 10 and 11, the decoding device may perform operations corresponding to the operations performed by the encoding device. The decoding device may perform prediction on the current block based on the received prediction information and derive prediction samples.

Specifically, the decoding device may derive an intra prediction mode for the current block based on the received prediction mode information (S1001). The decoding device may derive neighboring reference samples of the current block (S1002). The decoding device generates prediction samples in the current block based on the intra prediction mode and the neighboring reference samples (S1003). In this case, the decoding device may perform a prediction sample filtering procedure. Prediction sample filtering may be referred to as post filtering. Some or all of the prediction samples may be filtered by the prediction sample filtering procedure. In some cases, the prediction sample filtering procedure may be omitted.

The decoding device generates residual samples for the current block based on the received residual information (S1004). The decoding device may generate reconstructed samples for the current block based on the (filtered) prediction samples and the residual samples and generate a reconstructed picture based thereupon (S1005).

Here, the intra prediction unit 265 of the decoding device may include a prediction mode determination unit 266, a reference sample derivation unit 267, and a prediction sample derivation unit 268. The prediction mode determination unit 266 may determine an intra prediction mode for the current block based on the prediction mode information received from the prediction mode determination unit 186 of the encoding device. The reference sample derivation unit 266 may derive neighboring reference samples of the current block, and the sample derivation unit 267 may derive prediction samples of the current block. Meanwhile, although not shown, when a prediction sample filtering procedure as described above is performed, the intra prediction unit 265 may further include a prediction sample filter unit (not shown).

The prediction mode information may include flag information (e.g., prev_intra_luma_pred_flag) indicating whether a most probable mode (MPM) is applied to the current block or a remaining mode is applied thereto. When the MPM is applied to the current block, the prediction mode information may further include index information (e.g., mpm_idx) indicating one of the intra prediction mode candidates (MPM candidates) The intra prediction mode candidates (MPM candidates) may be configured as an MPM candidate list or an MPM list. Further, when the MPM is not applied to the current block, the prediction mode information may further include remaining mode information (ex. rem_inra_luma_pred_mode) indicating one of the remaining intra prediction modes except for the intra prediction mode candidates (MPM candidates). The decoding device may determine the intra prediction mode of the current block based on the prediction mode information. The prediction mode information may be encoded/decoded through a coding method described below. For example, the prediction mode information may be encoded/decoded through entropy encoding (e.g., CABAC or CAVLC) based on a truncated (rice) binary code.

Determine Intra Prediction Mode

When intra prediction is applied, an intra prediction mode applied to the current block may be determined using the intra prediction modes of neighboring blocks. For example, the decoding device may select one of the most probable mode (mpm) candidates derived based on the intra prediction mode of the left block of the current block and the intra prediction mode of the upper block, based on the received mpm index or may select one of the remaining intra prediction modes, which are not included in the mpm candidates, based on the remaining intra prediction mode information. The mpm index may be signaled in the form of an mpm_idx syntax element, and the remaining intra prediction mode information may be signaled in the form of a rem_intra_luma_pred_mode syntax element. For example, the remaining intra prediction mode information may indicate one of the remaining intra prediction modes, which are not included in the mpm candidates among all the intra prediction modes and have been indexed in order of the prediction mode numbers.

FIGS. 12 and 13 are views illustrating prediction directions of intra prediction modes according to an embodiment of the disclosure.

Referring to FIG. 12, the intra prediction mode may include two non-directional intra prediction modes and 33 directional intra prediction modes. The non-directional intra prediction modes may include a planar intra prediction mode and a DC intra prediction mode, and the directional intra prediction modes may include number 2 through 34 intra prediction modes. The planar intra prediction mode may be referred to as a planner mode, and the DC intra prediction mode may be referred to as a DC mode.

Meanwhile, in order to capture any edge direction presented in the natural video, the directional intra prediction modes may be extended from 33 to 65 as illustrated in FIG. 13. In this case, the intra prediction mode may include two non-directional intra prediction modes and 65 directional intra prediction modes. The non-directional intra prediction modes may include a planar intra prediction mode and a DC intra prediction mode, and the directional intra prediction modes may include number 2 through 66 intra prediction modes. The extended directional intra prediction may be applied to blocks of all sizes, and may be applied to both the luma component and the chroma component.

Referring to FIG. 13, in an embodiment, the intra prediction mode may include 67 modes. The prediction direction according to each prediction mode index (or mode number) is as illustrated in FIG. 13. Prediction mode indexes 0 and 1 represent the planar mode and the DC mode, respectively. Prediction mode indexes 2 to 66 represent the prediction directions of angles divided from the lower left arrow to the upper right arrow as illustrated in FIG. 13. Among the 65 angles, prediction modes 2, 18, 50, and 66 represent a horizontal diagonal direction, a horizontal direction, a vertical direction, and a vertical diagonal direction, respectively.

Alternatively, the intra prediction mode may include two non-directional intra prediction modes and 129 directional intra prediction modes. The non-directional intra prediction modes may include a planar intra prediction mode and a DC intra prediction mode, and the directional intra prediction modes may include number 2 through 130 intra prediction modes.

The prediction unit of the encoding device/decoding device may derive a reference sample according to the intra prediction mode of the current block from among the neighboring reference samples of the current block, and may generate a prediction sample of the current block based on the reference sample.

For example, prediction samples may be derived i) based on an average or interpolation of the neighboring reference samples of the current block, and (ii) based on a reference sample present in a specific (prediction) DC regulator 163 for the prediction sample among the neighboring reference samples of the current block. Case (i) may be referred to as a non-directional mode or a non-angular mode, and case (ii) as a directional mode or an angular mode. Further, in an embodiment, a multi reference sample line using one or more reference sample lines for intra prediction may be used for more accurate prediction.

According to an embodiment of the disclosure, there is proposed a method for configuring a most probable mode (MPM) to effectively reduce the overhead of signaling the intra prediction mode in an environment where the number of intra prediction modes increases as compared with those by the conventional image compression techniques as described above in connection with FIG. 13. According to an embodiment of the disclosure, coding efficiency may be enhanced in terms of reducing signaling overhead by efficiently coding the intra prediction mode. By reducing the signaling overhead, better coding efficiency may be obtained in terms of BD-rate/BD-PSNR.

On the encoder side, the best intra prediction mode is determined as the optimized prediction mode considering both the bit rate and distortion. Thereafter, the optimal (selected) prediction intra mode is coded through the bit stream, and the decoder performs intra prediction using the optimal intra prediction mode parsed from the bit stream. However, as described above, the increased number of intra prediction modes requires efficient intra mode coding to minimize signaling overhead.

The MPM list (or MPM candidate list) may be configured using intra prediction modes of neighboring intra-coded blocks in both the encoder and the decoder. When the optimal prediction mode selected by the encoder is one of the prediction modes included in the MPM list, overhead may be minimized through MPM index signaling.

FIG. 14 illustrates an example of neighboring blocks used as an MPM candidate according to an embodiment of the disclosure.

In a conventional video compression technique (e.g., HEVC), three MPM lists are generated based on two neighboring intra prediction modes of positions F and G illustrated in FIG. 14. When at least one of the following three is met, F or G may be set to a DC mode.

When F or G is unavailable

When F or G is not an intra-coded block

When F or G is out of the current coding tree unit (CTU) to which the current block belongs In the disclosure, for convenience of description, the intra prediction modes of blocks in positions A to G illustrated in FIG. 14 may be represented as A to G, respectively. That is, F or G refers to the intra prediction mode of the block in position F or G, respectively. If F and G are determined, the three MPM lists may be configured based on the pseudo code of Table 2 below.

TABLE 2

```
if (intra mode of F and G are equal)
    {
        if (intra mode of F < intra mode 2)
        { MPM list1 }
        else
        { MPM list2 }
    }
else
{
        If (Neither intra mode of F nor G are intra mode Planar)
        { MPM list3 }
        else if (intra mode of (F+G) <intra mode 2)
        { MPM list4 }
        else
        { MPM list5 }
}
```

Referring to Table 2, in the case where F and G are the same, when F is smaller than 2 (or prediction mode 2, mode 2, or prediction mode 2), a first MPM list is generated (or derived), and when F is not smaller than 2, a second MPM list may be generated.

In the case where F and G are not the same, when F or G is not the planar mode, a third MPM list may be generated and, when (F+G) is smaller than 2, a fourth list may be generated, otherwise, a fifth MPM list may be generated.

In an embodiment, the number of MPM candidates included in the MPM list may be set to differ depending on the number of intra prediction modes. In general, as the number of intra prediction modes increases, the number of MPM candidates may increase. However, the disclosure is not limited thereto, and for example, the 35 and 67 intra modes may have various numbers (e.g., 3, 4, or 5) of MPM candidates depending on the design.

Further, in an embodiment, when configuring an MPM list using 6 MPM candidates, the encoder/decoder may search for neighboring blocks in various positions and may continuously perform pruning-check to exclude the same intra prediction mode. For example, the encoder/decoder may configure the MPM list of six members by searching in the order of block D, block B, planar mode, DC mode, block E, block C, and block A illustrated in FIG. 14. If the MPM list does not meet the maximum number of candidates, an adjacent angle mode and a predefined basic mode may be considered as an MPM candidate. Here, the adjacent angular mode denotes a prediction mode adjacent to the prediction direction of the directional mode added to the MPM list. Such a search and pruning-check may advantageously save bit rates but may suffer from an increase in the number of hardware operation periods for configuring the MPM list. In the worst scenario case, when an image with a size of 3840×2160, i.e., a 4K image, is divided into 4×4 blocks for intra prediction of the 4K image, the hardware operation period increased for each 4×4 block may have a decisive effect on throughput.

Further, in one embodiment, if neighboring inter-coded blocks know their intra prediction modes, the intra prediction modes may be used to configure an MPM list.

When 67 intra prediction modes are used for intra prediction, the MPM list of 3 candidates (or three-MPM list) used in conventional image compression techniques are not sufficient to indicate the increased diversity of intra prediction modes. Further, the six-MPM list including the pruning check function and the function to search all defined neighboring locations until a predetermined number of MPM candidates (or the length of the MPM list) are met are too high in complexity, which may greatly affect throughput.

Therefore, the disclosure proposes a method for efficiently configuring MPM lists for efficient balancing between complexity and coding efficiency so as to mitigate such issues. As used herein, the term "disclosure" may be replaced with other terms, such as "document," "specification," or "description."

FIG. 15 is a flowchart illustrating a method of configuring an MPM list based on predefined conditions according to an embodiment of the disclosure.

Although the description with reference to FIG. 15 focuses primarily on a decoder for ease of description, the method for configuring an MPM list according to the instant embodiment may apply to encoders in substantially the same manner. In an embodiment of the disclosure, the encoder/decoder may derive an efficient MPM list by identifying predefined conditions.

Specifically, the decoder identifies whether a predefined first condition is met (S1501). When the first condition is met, the decoder derives a first MPM list (S1502). If the first condition is not met, the decoder identifies whether a predefined second condition is met (S1503).

When the second condition is met, the decoder identifies whether a predefined third condition is met (S1504). When the third condition is met, the decoder derives a second MPM list (S1505). If the third condition is not met, the decoder identifies whether a predefined fourth condition is met (S1506). When the fourth condition is met, the decoder derives a third MPM list (S1507). If the fourth condition is not met, the decoder derives a fourth MPM list (S1508). If the second condition is not met, the decoder derives a fifth MPM list (S1509).

In an embodiment of the disclosure, the decoder may derive 5 MPM lists (or 5 types of MPM lists) based on the four predefined conditions. In this case, an intra prediction mode of a neighboring block in a predefined position or a predefined basic (or default) intra prediction mode as exemplified in FIG. 14 may be used. The basic intra prediction mode denotes an intra prediction mode that is statistically widely used. For example, the basic intra prediction mode may include a planar mode, a DC mode, a vertical mode, a horizontal mode, a horizontal diagonal mode, or a vertical diagonal mode. In other words, the first to fifth MPM lists may be determined using the intra prediction mode of the neighboring block and/or the basic intra prediction mode according to their respective predetermined conditions.

Further, in an embodiment, k denotes the length (or number of MPM candidates) of an efficient MPM list proposed in the disclosure, and k may be set to various values, such as 3, 4, 5, and 6. As an example, k may be a value less than 6 (e.g., 5). In this case, before generating an MPM list (k-MPM list) including k candidates, a specific intra prediction mode may be considered as the highest candidate for intra prediction. In other words, the encoder/decoder may determine whether a specific intra prediction mode is applied to the current block and, if the specific intra prediction mode does not apply to the current block, may generate a k-MPM list.

FIG. 16 is a flowchart illustrating a method of configuring an MPM list according to predefined conditions by using a shared list according to an embodiment of the disclosure. Although the description with reference to FIG. 16 focuses primarily on a decoder for ease of description, the method for configuring an MPM list according to the instant embodiment may apply to encoders in substantially the same manner. In an embodiment of the disclosure, the encoder/decoder may derive an efficient MPM list according to predefined conditions by using a shared list. The shared list is a list to be shared before determining the final MPM list according to each condition, and may include at least one intra prediction mode. In the disclosure, the shared list may be referred to as a shared MPM list, a temporary list, or a temporary MPM list.

Specifically, the decoder identifies whether a predefined first condition is met (S1601). When the first condition is met, the decoder derives a first MPM list (S1602). If the first condition is not met, the decoder identifies whether a predefined second condition is met (S1603).

When the second condition is met, the decoder derives a first shared list (S1604). The decoder identifies whether a predefined third condition is met (S1605). When the third condition is met, the decoder derives a second MPM list by adding (or inserting) an intra prediction mode to the first shared list (S1606).

If the third condition is not met, the decoder derives a second shared list (S1607). As an embodiment, the second shared list may be a list in which at least one intra prediction mode is added to the first shared list. The decoder identifies whether a predefined fourth condition is met (S1608). When the fourth condition is met, the decoder derives a third MPM list by adding an intra prediction mode to the second shared list (S1609). If the fourth condition is not met, the decoder derives a fourth MPM list by adding an intra prediction mode to the second shared list (S1610). If the second condition is not met, the decoder derives a fifth MPM list (S1611).

In an embodiment of the disclosure, the decoder may derive 5 MPM lists (or 5 types of MPM lists) based on the four predefined conditions. In this case, an intra prediction mode of a neighboring block in a predefined position or a predefined basic (or default) intra prediction mode as exemplified in FIG. 14 may be used. The basic intra prediction mode denotes an intra prediction mode that is statistically widely used. For example, the basic intra prediction mode may include a planar mode, a DC mode, a vertical mode, a horizontal mode, a horizontal diagonal mode, or a vertical diagonal mode. In other words, the first to fifth MPM lists may be determined using the intra prediction mode of the neighboring block and/or the basic intra prediction mode according to their respective predetermined conditions. Further, the first and second shared lists may be derived using an intra prediction mode of a neighboring block in a predefined position and/or a predefined basic (or default) intra prediction mode illustrated in FIG. 14 above.

Hereinafter, specific examples of the conditions, shared lists, and final MPM list described in connection with the embodiment of FIG. 16 are described. However, the method proposed in FIG. 16 is not limited to the example of FIG. 17 to be described below.

FIG. 17 is a flowchart illustrating a method of configuring an MPM list based on predefined conditions according to an embodiment of the disclosure.

Although the description with reference to FIG. 17 focuses primarily on a decoder for ease of description, the method for configuring an MPM list according to the instant embodiment may apply to encoders in substantially the same manner. In an embodiment of the disclosure, the encoder/decoder may derive an efficient MPM list according to predefined conditions by using a shared list.

Specifically, the decoder identifies whether the intra prediction modes (or mode numbers and indexes of the prediction modes) of the left and upper neighboring blocks of the current block are all smaller than or equal to the DC mode (S1701). In the disclosure, the intra prediction mode of the left neighboring block may be referred to as a left mode or L, and the intra prediction mode of the upper neighboring block may be referred to as an upper mode or A.

When both the left mode and the upper mode are smaller than or equal to the DC mode, the decoder derives a first MPM list (S1702). The first MPM list may include a planar mode, a DC mode, a vertical mode, a horizontal mode, a mode having an index resultant from subtracting 4 from the vertical mode, and a mode having an index resultant from adding 4 to the vertical mode.

When neither the left mode nor the upper mode is smaller than or equal to the DC mode, the decoder identifies whether the left mode and the upper mode are not the same (S1703).

If the left mode and the upper mode are not the same, the decoder derives a first shared list (S1704). The first shared list may include the left mode and the upper mode.

The decoder identifies whether the left mode or the upper mode is smaller than or equal to the DC mode (S1705). When the left mode or the upper mode is smaller than or equal to the DC mode, the decoder derives a second MPM list by adding (or inserting) the remaining intra prediction modes to the first shared list (S1706). In the disclosure, the maximum mode denotes a mode having a larger index value of the left mode or the upper mode, and the minimum mode denotes a mode having a smaller index value of the left mode or the upper mode. The remaining intra prediction modes may include a non-directional mode different from the minimum mode (i.e., a planar mode when the minimum mode is a DC mode or a DC mode when the minimum mode is a planner mode), a mode resultant from subtracting 1 from the maximum mode, a mode resultant from adding 1 to the maximum mode, and a mode resultant from subtracting 2 from the maximum mode.

If the left mode or the upper mode is not smaller than or equal to the DC mode, the decoder derives a second shared list (S1707). As an embodiment, the second shared list may be a list obtained by adding a planner mode and a DC mode to the first shared list.

The decoder identifies whether the difference between the maximum value and the minimum value of the prediction mode index in the currently added list (i.e., the second shared list) is greater than or equal to 63 (S1708). When the condition of step S1708 is met, the decoder derives a third MPM list by adding a mode resultant from subtracting 1 from the maximum mode and a mode resultant from adding 1 to the minimum mode to the second shared list (S1709). If the condition of step S1708 is not met, the decoder derives a fourth MPM list by adding a mode resultant from subtracting 1 from the minimum mode and a mode resultant from adding 1 to the maximum mode to the second shared list (S1710). When the left mode and the upper mode are the same, the decoder derives a fifth MPM list (S1711). The fifth MPM list may include a left mode, a planner mode, a DC mode, a mode resultant from subtracting 1 from the left mode, a mode resultant from adding 1 to the left mode, and a mode resultant from subtracting 2 from the left mode.

In an embodiment, the left neighboring block of the current block used as an MPM candidate may be set as a neighboring block in position D of FIG. 14, and the upper neighboring block may be set as a neighboring block in position B of FIG. 14.

Further, in an embodiment, a specific example of a method of generating an efficient k-MPM list using a shared list is described. It is assumed that k is 6 and 4 predefined conditions are used to configure 5 MPM lists. Hereinafter, in FIG. 14, the intra modes in neighboring positions B and D may be denoted as L and A, respectively.

In the first step, the encoder/decoder may identify whether L and A are non-directional intra prediction modes using the first condition of Equation 1 below. In this case, the non-directional intra prediction modes may include a planar mode and a DC mode. If the first condition is met, the encoder/decoder may perform a fifth step to be described below.

Otherwise, the encoder/decoder may perform the next second step.

$$L<=DC\_idx \text{ and } A<=DC\_idx \quad \text{[Equation 1]}$$

In the second step, the encoder/decoder may determine whether L and A are different intra prediction modes from each other using the second condition of Equation 2 below. If the second condition is met, the encoder/decoder may perform the next third step, otherwise the encoder/decoder may perform the ninth step described below.

[Equation 2]

$$L!=A \quad \text{[Equation 2]}$$

In the third step, the encoder/decoder may create a shared list as illustrated in Table 3 below.

TABLE 3 mpm[0] = L
mpm[1] = A
If L>A, max_idx is 0 and min_idx is 1.
Otherwise, max_idx is 1 and min_idx is 0.

Referring to Table 3, the maximum mode is denoted as max_idx, and the minimum mode is denoted as min_idx. Further, the encoder/decoder may identify whether one of L or A is a non-directional mode using the third condition of Equation 3 below. If the third condition is met, the encoder/decoder may perform a sixth step to be described below, otherwise perform the next fourth step.

$$L<=DC\_idx \text{ OR } A<=DC\_idx \quad \text{[Equation 3]}$$

In the fourth step, the encoder/decoder may create a shared list as illustrated in Table 4 below.

TABLE 4 mpm[2] = Planar_idx
mpm[3] = DC_idx

Thereafter, the encoder/decoder may identify whether the difference between the maximum mode and the minimum mode is smaller than or equal to 63 using the fourth condition of Equation 4 below. If the fourth condition is met, the encoder/decoder may perform a seventh step described below, otherwise, perform the eighth step described below.

$$mpm[max\_idx]-mpm[min\_idx]<=63 \quad \text{[Equation 4]}$$

In the fifth step, the encoder/decoder may generate an MPM list as illustrated in Table 5 below.

TABLE 5 mpm[0] = L
mpm[1] = ! L
mpm[2] = Vertical_idx
mpm[3] = Horizontal_idx
mpm[4] = Vertical_idx-4
mpm[5] = Vertical_idx+4

The encoder/decoder may generate a final MPM list by adding the remaining prediction modes to the shared list generated in the above step.

Specifically, in the sixth step, the encoder/decoder may generate an MPM list as illustrated in Table 6 below.

TABLE 6 mpm[2] = ]=! mpm[min_idx]
mpm[3] = mpm[max_idx]-1
mpm[4] = mpm[max_idx]+1
mpm[5] = mpm[max_idx]-2

In the seventh step, the encoder/decoder may generate an MPM list as illustrated in Table 7 below.

TABLE 7 mpm[4] = mpm[max_idx]-1
mpm[5] = mpm[min_idx]+1

In the eighth step, the encoder/decoder may generate an MPM list as illustrated in Table 8 below.

TABLE 8 mpm[4] = mpm[min_idx]-1
mpm[5] = mpm[max_idx]+1

In the ninth step, the encoder/decoder may generate an MPM list as illustrated in Table 9 below.

TABLE 9 mpm[0] = L
mpm[2] = Planar_idx
mpm[3] = DC_idx
mpm[3] = L-1
mpm[4] = L+1
mpm[5] = L-2

In FIG. 17 and the above-described embodiments, a method of adding a neighboring prediction mode as an MPM candidate has been described. +1, −1, +2, and −2 modes were used to add neighboring prediction modes. However, in some cases, the addition or subtraction may result in a non-directional mode that destroys the consistency of a neighboring intra mode, or the maximum available intra mode index may be exceeded. For example, a value obtained by subtracting 1 from prediction mode 2 becomes 1, which is the index of the DC mode. Further, a mode obtained by adding 1 to prediction mode 66 exceeds the maximum intra mode index value.

Therefore, in order to address these issues, the disclosure proposes a modularizing method for adding a neighboring prediction mode. The encoder/decoder may apply the modularizing method of Equation 5 below to use the prediction modes in the adjacent directions of +1, −1, and −2.

Intra mode −1:(Intra mode +62)%65+2

Intra mode +1:(Intra mode −1)%65+2

$$\text{Intra mode } -2\text{:(Intra mode }+61)\%65+2 \quad \text{[Equation 5]}$$

In Equation 5, % denotes the remainder operator. The encoder/decoder may derive a −1 mode (i.e., a mode resultant from subtracting 1) by adding 62 to the intra prediction mode, dividing the result by 65, and then adding 2 to the remainder. Further, the encoder/decoder may derive a +1 mode (i.e., a mode resultant from adding 1) by subtracting 1 from the intra prediction mode, dividing the result by 65, and then adding 2 to the remainder. Further, the encoder/decoder may derive a −2 Mode (i.e., a mode resultant from subtracting 2) by adding 61 to the intra prediction mode, dividing the result by 65, and then adding 2 to the remainder.

In an embodiment of the disclosure, an intra mode coding method having 6 MPMs may be used to accommodate an increased number of directional intra modes. In this case, truncated unary binarization may be applied for entropy coding of 6 MPMs.

Specifically, the first three bins may be coded based on a context depending on the MPM mode related to the currently signaled bin. MPM modes may be classified into the following three categories. (a) whether the prediction mode is in the horizontal direction (i.e., whether the MPM mode is smaller than or equal to the diagonal direction), (b) whether the prediction mode is in the vertical direction (i.e., whether it is greater than the diagonal direction), and (c) whether the prediction mode is a non-directional mode (i.e., whether it is a planner mode or a DC mode)

Accordingly, the MPM index may be signaled using three contexts corresponding to the three classifications described above.

Coding of the remaining 61 non-MPMs is performed as follows. The 61 non-MPMs may be divided into two sets: a selected mode set; and a non-selected mode set. The selected mode set may include 16 modes. The rest (i.e., 45 modes) may be allocated to the non-selected mode set. The mode set to which the current mode belongs, along with a flag, may be signaled in a bit stream. Further, the prediction mode of the selected set may be signaled (or binarized) using a code with a fixed length of 4 bits, and the prediction mode of the non-selected mode set may be signaled (or binarized) with a truncated unary binary code. The selected mode set and the non-selected mode set may be generated through sub-sampling for a total of 61 non-MPM modes using the following index.

selected mode set={0, 4, 8, 12, 16, 20, . . . , 60}
non-selected mode set={1, 2, 3, 5, 6, 7, 9, 10, . . . , 59}

FIG. 18 is a flowchart illustrating a method of configuring an MPM list based on predefined conditions according to an embodiment of the disclosure.

Although the description with reference to FIG. 18 focuses primarily on a decoder for ease of description, the method for configuring an MPM list according to the instant embodiment may apply to encoders in substantially the same manner. In an embodiment of the disclosure, the encoder/decoder may derive an efficient MPM list according to predefined conditions by using a shared list.

Specifically, the decoder identifies whether the left mode and the upper mode are the same (S1801). In the disclosure, the intra prediction mode of the left neighboring block may be referred to as a left mode or L, and the intra prediction mode of the upper neighboring block may be referred to as an upper mode or A.

When the left mode and the upper mode are the same, the decoder identifies whether the left mode is greater than the DC mode (S1802). When the left mode is greater than the DC mode, the decoder derives a first MPM list (S1803). The first MPM list may include a left mode, a planner mode, a DC mode, a mode resultant from subtracting 1 from the left mode, a mode resultant from adding 1 to the left mode, and a mode resultant from subtracting 2 from the left mode.

If the left mode is not greater than the DC mode, the decoder derives a second MPM list (S1804). The second MPM list may include a left mode, a non-directional mode different from the left mode, a vertical mode, a horizontal mode, a mode having an index resultant from subtracting 4 from the vertical mode, and a mode having an index resultant from adding 4 to the vertical mode.

If the left mode and the upper mode are not the same, the decoder derives a first shared list (S1805). The first shared list may include the left mode and the upper mode.

The decoder identifies whether the left mode and the upper mode are greater than the DC mode (S1806). When the left mode and the upper mode are not greater than the DC mode, the decoder identifies whether the sum of the left mode and the upper mode is greater than or equal to 2 (S1807). If the sum of the left mode and the upper mode is smaller than 2, the decoder derives the second MPM list. When the sum of the left mode and the upper mode is greater than or equal to 2, a third MPM list is derived by adding (or inserting) remaining intra prediction modes to the first shared list (S1808). In the disclosure, the maximum mode denotes a mode having a larger index value of the left mode or the upper mode, and the minimum mode denotes a mode having a smaller index value of the left mode or the upper mode. The remaining intra prediction modes may include a non-directional mode different from the minimum mode (i.e., a planar mode when the minimum mode is a DC mode or a DC mode when the minimum mode is a planner mode), a mode resultant from subtracting 1 from the maximum mode, a mode resultant from adding 1 to the maximum mode, and a mode resultant from subtracting 2 from the maximum mode.

When the left mode and the upper mode are greater than the DC mode, the decoder derives a second shared list (S1809). As an embodiment, the second shared list may be a list obtained by adding a planner mode and a DC mode to the first shared list.

The decoder identifies whether the difference between the minimum mode and the maximum mode is not 64 and is not 1 (S1810). If the condition of step S1810 is not met, the decoder derives a fourth MPM list by adding a mode resultant from subtracting 2 from the maximum mode and a mode resulting from adding 2 to the maximum mode to the second shared list (S1811). If the condition of step S1810 is not met, the decoder derives a fifth MPM list by adding a mode resultant from subtracting 1 from the maximum mode and a mode resultant from adding 1 to the maximum mode to the second shared list (S1812).

In an embodiment, the left neighboring block of the current block used as an MPM candidate may be set as a neighboring block in position D of FIG. 14, and the upper neighboring block may be set as a neighboring block in position B of FIG. 14.

Further, in an embodiment, a specific example of a method of generating an efficient k-MPM list using a shared list is described. It is assumed that k is 6 and 5 predefined conditions are used to configure 5 MPM lists. Hereinafter, in FIG. 14, the intra modes in neighboring positions B and D may be denoted as L and A, respectively.

In the first step, the encoder/decoder may identify whether L and A are the same using the first condition of Equation 6 below. The encoder/decoder may perform the next second step if the first condition is met, and otherwise, perform the next third step.

$$L == A \qquad \text{[Equation 6]}$$

In the second step, when L and A are the same, the encoder/decoder may identify whether L is greater than the DC mode using the second condition of Equation 7 below. If the second condition is met, the encoder/decoder may perform the sixth step described below, otherwise, perform the seventh step described below.

$$L > DC\_idx \qquad \text{[Equation 7]}$$

In the third step, the encoder/decoder may create a shared list as illustrated in Table 10 below.

TABLE 10

| |
|---|
| mpm[0] = L |
| mpm[1] = A |
| If L>A, max_idx is 0 and min_idx is 1. |
| Otherwise, max_idx is 1 and min_idx is 0. |

Referring to Table 10, the maximum mode is denoted as max_idx, and the minimum mode is denoted as min_idx. Further, the encoder/decoder may identify whether one of L or A is a non-directional mode using the third condition of Equation 8 below. If the third condition is met, the encoder/decoder may perform the next fourth step, otherwise the encoder/decoder may perform the fifth step described below.

$$L > DC\_idx \text{ AND } A > DC\_idx \qquad \text{[Equation 8]}$$

In the fourth step, the encoder/decoder may create a shared list as illustrated in Table 11 below.

TABLE 11

| |
|---|
| mpm[2] = Planar_idx |
| mpm[3] = DC_idx |
| diff=mpm[max_idx]−mpm[min_idx] |

Thereafter, the encoder/decoder may identify whether the difference between the maximum mode and the minimum mode is not 64 and is not 1 using the fourth condition of Equation 9 below. If the fourth condition is met, the encoder/decoder may perform the tenth step described below, otherwise, perform the ninth step described below.

$$\text{diff} != 64 \text{ AND diff} != 1 \qquad \text{[Equation 9]}$$

In the fifth step, the encoder/decoder may identify whether L and A are non-directional modes using the fifth condition of Equation 10 below. If the fifth condition is met, the encoder/decoder may perform the seventh step, otherwise, perform the eighth step.

$$L + A >= 2 \qquad \text{[Equation 10]}$$

In the sixth step, the encoder/decoder may generate an MPM list as illustrated in Table 12 below.

TABLE 12

| |
|---|
| mpm[0] = L |
| mpm[2] = Planar_idx |
| mpm[3] = DC_idx |
| mpm[3] = L−1 |
| mpm[4] = L+1 |
| mpm[5] = L−2 |

In the seventh step, the encoder/decoder may generate an MPM list as illustrated in Table 13 below.

TABLE 13

| |
|---|
| mpm[0] = L |
| mpm[1] = ! L |
| mpm[2] = Vertical _idx |
| mpm[3] = Horizontal_idx |
| mpm[4] = Vertical_idx−4 |
| mpm[5] = Vertical_idx+4 |

The encoder/decoder may generate a final MPM list by adding the remaining prediction modes to the shared list generated in the above step.

Specifically, in the eighth step, the encoder/decoder may generate an MPM list as illustrated in Table 14 below.

TABLE 14

| |
|---|
| mpm[2] = ! mpm[min_idx] |
| mpm[3] = mpm[max_idx]−1 |
| mpm[4] = mpm[max_idx]+1 |
| mpm[5] = mpm[max_idx]−2 |

In the ninth step, the encoder/decoder may generate an MPM list as illustrated in Table 15 below.

TABLE 15

| |
|---|
| mpm[4] = mpm[max_idx]−2 |
| mpm[5] = mpm[max_idx]+2 |

In the tenth step, the encoder/decoder may generate an MPM list as illustrated in Table 16 below.

TABLE 16

| |
|---|
| mpm[4] = mpm[max_idx]−1 |
| mpm[5] = mpm[max_idx]+1 |

The embodiments of the disclosure described above may be implemented independently or in a combination of one or more thereof.

FIG. 19 is a flowchart illustrating a method of generating an intra prediction block according to an embodiment of the disclosure.

Referring to FIG. 19, the following description focuses primarily on a decoder for convenience of description, but the disclosure is not limited thereto, and the method of generating an intra prediction block according to an embodiment of the disclosure may be performed in an encoder and a decoder in the same manner.

The decoder obtains an MPM flag indicating whether the most probable mode (MPM) is applied to the current block (S1901). Here, the MPM denotes a mode in which the intra prediction mode of the current block is derived from an intra-predicted block surrounding the current block.

When the MPM is applied to the current block, the decoder configures an MPM list based on whether intra prediction modes of left and upper neighboring blocks of the current block meet predefined conditions (S1902).

The decoder obtains an MPM index indicating a specific intra prediction mode in the MPM list (S1903).

The decoder generates a prediction block of the current block using an intra prediction mode specified by the MPM index (S1904).

As described above, the left neighboring block may be set as a block including a pixel horizontally adjacent to a left lower sample in the current block, and the upper neighboring block may be set as a block including a pixel vertically adjacent to an upper right sample in the current block.

As described above, step S1902 may further include configuring one of a specific number of MPM lists based on four pre-defined conditions.

Specifically, as described above, step S1902 may include, when a first condition is met, configuring a first MPM list, when a second condition and a third condition are met, but the first condition is not met, configuring a second MPM list, when the second condition and a fourth condition are met, but the first condition and the third condition are not met, configuring a third MPM list, when the second condition is met, but the first condition, the third condition, and the fourth condition are not met, configuring a fourth MPM list, and when the first condition and the second condition are not met, configuring a fifth MPM list.

As described above, the first condition may be set as whether the intra prediction modes of the left neighboring block and a right neighboring block are smaller than, or equal to, a DC mode, the second condition may be set as whether the intra prediction modes of the left neighboring block and the right neighboring block are not equal to each other, the third condition may be set as whether the intra prediction mode of the left neighboring block or the right neighboring block is smaller than, or equal to, the DC mode, and the fourth condition may be set as whether a difference between a maximum mode indicating a mode with a larger mode index value of the intra prediction modes of the left neighboring block and the right neighboring block and a minimum mode indicating a mode with a smaller mode index value of the intra prediction modes of the left neighboring block and the right neighboring block is smaller than a predefined specific value.

FIG. 20 is a block diagram illustrating an example device for processing video signals according to an embodiment of the disclosure. The video signal processing device of FIG. 20 may correspond to the encoding device of FIG. 1 or the decoding device of FIG. 2. The video signal processing device of FIG. 20 may process video signals by applying the method described with reference to FIGS. 1 to 19.

The video signal processing device 2000 for processing video signals may include a memory 2020 for storing video signals and a processor 2010 coupled with the memory to process video signals.

According to an embodiment of the disclosure, the processor 2010 may be configured as at least one processing circuit for processing image signals and may execute instructions for encoding or decoding image signals to thereby process image signals. In other words, the processor 2010 may encode raw image data or decode encoded image signals by executing encoding or decoding methods described above.

FIG. 21 illustrates a video coding system to which the disclosure is applied.

The video coding system may include a source device and a receive device. The source device may transmit to the receive device, encoded video/image information or data through a digital storage medium or over a network in a file or streaming form.

The source device may include a video source, an encoding apparatus, and a transmitter. The receive device may include a receiver, a decoding apparatus and a renderer. The encoding apparatus may be called a video/image encoding apparatus. The decoding apparatus may be called a video/image decoding apparatus. The transmitter may be included in the encoding apparatus. The receiver may be included in the decoding apparatus. The renderer may include a display. The display may be configured for each device or external component.

The video source may obtain a video/image through the capture, synthesis or generation process of a video/image. The video source may include a video/image capture device and/or a video/image generation device. The video/image capture device may include one or more cameras, a video/image archive including a previously captured video/image, etc., for example. The video/image generation device may include a computer, a tablet and a smartphone, for example, and may (electronically) generate a video/image. For example, a virtual video/image may be generated through a computer. In this case, a process of generating related data may be substituted with a video/image capture process.

The encoding apparatus may encode an input video/image. The encoding apparatus may perform a series of procedures, such as prediction, a transform, and quantization, for compression and coding efficiency. Encoded data (encoded video/image information) may be output in a bitstream form.

The transmitter may transmit to the receiver of the receive device, encoded video/image information or data output in a bitstream form through a digital storage medium or over a network in a file or streaming form. The digital storage medium may include various storage media, such as a USB, an SD, a CD, a DVD, Blu-ray, an HDD, and an SSD. The transmitter may include an element for generating a media file through a predefined file format, and may include an element for transmission over a broadcast/communication network. The receiver may extract the bitstream and transmit it to the decoding apparatus.

The decoding apparatus may decode a video/image by performing a series of procedures, such as de-quantization, an inverse transform, and prediction corresponding to operations of the encoding apparatus.

The renderer may render a decoded video/image. The rendered video/image may be displayed through a display.

FIG. 22 is an embodiment to which the disclosure is applied, and illustrates the structure of a content streaming system.

Referring to FIG. 22, the content streaming system to which the disclosure is applied may basically include an encoding server, a streaming server, a web server, a media storage, a user equipment and a multimedia input device.

The encoding server basically functions to generate a bitstream by compressing content input from multimedia input devices, such as a smartphone, a camera or a camcorder, into digital data, and to transmit the bitstream to the streaming server. For another example, if multimedia input devices, such as a smartphone, a camera or a camcorder, directly generate a bitstream, the encoding server may be omitted.

The bitstream may be generated by an encoding method or bitstream generation method to which the disclosure is applied. The streaming server may temporally store a bitstream in a process of transmitting or receiving the bitstream.

The streaming server transmits multimedia data to the user equipment based on a user request through the web server. The web server plays a role as a medium to notify a user that which service is provided. When a user requests a desired service from the web server, the web server transmits the request to the streaming server. The streaming server transmits multimedia data to the user. In this case, the content streaming system may include a separate control server. In this case, the control server functions to control an instruction/response between the apparatuses within the content streaming system.

The streaming server may receive content from the media storage and/or the encoding server. For example, if content is received from the encoding server, the streaming server may receive the content in real time. In this case, in order to provide smooth streaming service, the streaming server may store a bitstream for a given time.

Examples of the user equipment may include a mobile phone, a smart phone, a laptop computer, a terminal for digital broadcasting, personal digital assistants (PDA), a portable multimedia player (PMP), a navigator, a slate PC, a tablet PC, an ultrabook, a wearable device (e.g., a watch type terminal (smartwatch), a glass type terminal (smart glass), and a head mounted display (HMD)), digital TV, a desktop computer, and a digital signage.

The servers within the content streaming system may operate as distributed servers. In this case, data received from the servers may be distributed and processed.

As described above, the embodiments described in the disclosure may be implemented and performed on a processor, a microprocessor, a controller or a chip. For example, the function units illustrated in the drawings may be implemented and performed on a computer, a processor, a microprocessor, a controller or a chip.

Furthermore, the decoder and the encoder to which the disclosure is applied may be included in a multimedia broadcasting transmission and reception device, a mobile communication terminal, a home cinema video device, a digital cinema video device, a camera for monitoring, a video dialogue device, a real-time communication device such as video communication, a mobile streaming device, a storage medium, a camcorder, a video on-demand (VoD) service provision device, an over the top (OTT) video device, an Internet streaming service provision device, a three-dimensional (3D) video device, a video telephony device, and a medical video device, and may be used to process a video signal or a data signal. For example, the OTT video device may include a game console, a Blu-ray player, Internet access TV, a home theater system, a smartphone, a tablet PC, and a digital video recorder (DVR).

Furthermore, the processing method to which the disclosure is applied may be produced in the form of a program executed by a computer, and may be stored in a computer-readable recording medium. Multimedia data having a data structure according to the disclosure may also be stored in a computer-readable recording medium. The computer-readable recording medium includes all types of storage devices in which computer-readable data is stored. The computer-readable recording medium may include Blu-ray disk (BD), a universal serial bus (USB), a ROM, a PROM, an EPROM, an EEPROM, a RAM, a CD-ROM, a magnetic tape, a floppy disk, and an optical data storage device, for example. Furthermore, the computer-readable recording medium includes media implemented in the form of carriers (e.g., transmission through the Internet). Furthermore, a bit stream generated using an encoding method may be stored in a computer-readable recording medium or may be transmitted over wired and wireless communication networks.

Furthermore, an embodiment of the disclosure may be implemented as a computer program product using program code. The program code may be performed by a computer according to an embodiment of the disclosure. The program code may be stored on a carrier readable by a computer.

In the aforementioned embodiments, the elements and characteristics of the disclosure have been combined in a specific form. Each of the elements or characteristics may be considered to be optional unless otherwise described explicitly. Each of the elements or characteristics may be implemented in a form to be not combined with other elements or characteristics. Furthermore, some of the elements and/or the characteristics may be combined to form an embodiment of the disclosure. The sequence of the operations described in the embodiments of the disclosure may be changed. Some of the elements or characteristics of an embodiment may be included in another embodiment or may be replaced with corresponding elements or characteristics of another embodiment. It is evident that an embodiment may be constructed by combining claims not having an explicit citation relation in the claims or may be included as a new claim by amendments after filing an application.

The embodiment according to the disclosure may be implemented by various means, for example, hardware, firmware, software or a combination of them. In the case of an implementation by hardware, the embodiment of the disclosure may be implemented using one or more application-specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, etc.

In the case of an implementation by firmware or software, the embodiment of the disclosure may be implemented in the form of a module, procedure or function for performing the aforementioned functions or operations. Software code may be stored in the memory and driven by the processor. The memory may be located inside or outside the processor and may exchange data with the processor through a variety of known means.

It is evident to those skilled in the art that the disclosure may be materialized in other specific forms without departing from the essential characteristics of the disclosure. Accordingly, the detailed description should not be construed as being limitative, but should be construed as being illustrative from all aspects. The scope of the disclosure should be determined by reasonable analysis of the attached claims, and all changes within the equivalent range of the disclosure are included in the scope of the disclosure.

INDUSTRIAL APPLICABILITY

The aforementioned preferred embodiments of the disclosure have been disclosed for illustrative purposes, and those skilled in the art may improve, change, substitute, or add various other embodiments without departing from the technical spirit and scope of the disclosure disclosed in the attached claims.

The invention claimed is:
1. A method of decoding an image based on an intra prediction mode by an apparatus, the method comprising:
obtaining a most probable mode (MPM) flag informing whether an MPM is applied to a current block, the MPM denoting a mode in which an intra prediction mode of the current block is derived from an intra-predicted block around the current block;
configuring an MPM list based on whether intra prediction modes of left and upper neighboring blocks of the current block meet a predefined condition;
obtaining an MPM index indicating a specific intra prediction mode in the MPM list; and
generating a prediction block of the current block based on an intra prediction mode specified by the MPM index,
wherein the configuring the MPM list includes: deriving a first MPM list based on that the intra prediction mode of the left neighboring block and the intra prediction mode of the upper neighboring block are non-angular modes, and
wherein the first MPM list comprises a horizontal intra prediction mode a value of which is 18, a vertical intra prediction mode a value of which is 50, an intra prediction mode having a value of 46 obtained by subtracting 4 from the value of the vertical intra prediction mode, and an intra prediction mode having a value of 54 obtained by adding 4 to the value of the vertical intra prediction mode.

2. The method of claim 1, wherein the left neighboring block is set as a block including a pixel horizontally adjacent to a left lower sample in the current block, and wherein the upper neighboring block is set as a block including a pixel vertically adjacent to an upper right sample in the current block.

3. The method of claim 1, wherein the configuring the MPM list includes configuring one of a specific number of MPM lists based on four pre-defined conditions.

4. The method of claim 3, wherein the configuring the MPM list includes:

configuring a first MPM list based on that a first condition is met;

configuring a second MPM list based on that a second condition and a third condition are met but the first condition is not met;

configuring a third MPM list based on that the second condition and a fourth condition are met but the first condition and the third condition are not met;

configuring a fourth MPM list based on that the second condition is met but the first condition, the third condition, and the fourth condition are not met; and configuring a fifth MPM list based on that the first condition and the second condition are not met.

5. The method of claim 4, wherein the first condition is set as whether the intra prediction modes of the left neighboring block and the upper neighboring block are smaller than, or equal to, a DC mode, wherein the second condition is set as whether the intra prediction modes of the left neighboring block and the upper neighboring block are not equal to each other, wherein the third condition is set as whether the intra prediction mode of the left neighboring block or the intra prediction mode of the upper neighboring block is smaller than or equal to the DC mode, and wherein the fourth condition is set as whether a difference between a maximum mode indicating a mode with a larger mode index value among the intra prediction modes of the left neighboring block and the upper neighboring block and a minimum mode indicating a mode with a smaller mode index value among the intra prediction modes of the left neighboring block and the upper neighboring block is smaller than a predefined value.

6. A method of encoding an image based on an intra prediction mode by an apparatus, the method comprising:

signaling a most probable mode (MPM) flag informing whether an MPM is applied to a current block, the MPM denoting a mode in which an intra prediction mode of the current block is derived from an intra-predicted block around the current block;

configuring an MPM list based on whether intra prediction modes of left and upper neighboring blocks of the current block meet a predefined condition;

signaling an MPM index indicating a specific intra prediction mode in the MPM list; and generating a prediction block of the current block based on an intra prediction mode specified by the MPM index, wherein the configuring the MPM list includes: deriving a first MPM list based on that the intra prediction mode of the left neighboring block and the intra prediction mode of the upper neighboring block are non-angular modes, and wherein the first MPM list comprises a horizontal intra prediction mode a value of which is 18, a vertical intra prediction mode a value of which is 50, an intra prediction mode having a value of 46 obtained by subtracting 4 from the value of the vertical intra prediction mode, and an intra prediction mode having a value of 54 obtained by adding 4 to the value of the vertical intra prediction mode.

7. The method of claim 6, wherein the left neighboring block is set as a block including a pixel horizontally adjacent to a left lower sample in the current block, and wherein the upper neighboring block is set as a block including a pixel vertically adjacent to an upper right sample in the current block.

8. The method of claim 6, wherein the configuring the MPM list includes configuring one of a specific number of MPM lists based on four pre-defined conditions.

9. The method of claim 8, wherein the configuring the MPM list includes:

configuring a first MPM list based on that a first condition is met;

configuring a second MPM list based on that a second condition and a third condition are met but the first condition is not met;

configuring a third MPM list based on that the second condition and a fourth condition are met but the first condition and the third condition are not met;

configuring a fourth MPM list based on that the second condition is met but the first condition, the third condition, and the fourth condition are not met; and configuring a fifth MPM list based on that the first condition and the second condition are not met.

10. The method of claim 9, wherein the first condition is set as whether the intra prediction modes of the left neighboring block and the upper neighboring block are smaller than, or equal to, a DC mode, wherein the second condition is set as whether the intra prediction modes of the left neighboring block and the upper neighboring block are not equal to each other, wherein the third condition is set as whether the intra prediction mode of the left neighboring block or the intra prediction mode of the upper neighboring block is smaller than or equal to the DC mode, and wherein the fourth condition is set as whether a difference between a maximum mode indicating a mode with a larger mode index value among the intra prediction modes of the left neighboring block and the upper neighboring block and a minimum mode indicating a mode with a smaller mode index value among the intra prediction modes of the left neighboring block and the upper neighboring block is smaller than a predefined value.

11. A non-transitory computer-readable medium for storing encoded image information generated by performing steps of:

signaling a most probable mode (MPM) flag informing whether an MPM is applied to a current block, the MPM denoting a mode in which an intra prediction mode of the current block is derived from an intra-predicted block around the current block;

configuring an MPM list based on whether intra prediction modes of left and upper neighboring blocks of the current block meet a predefined condition;

signaling an MPM index indicating a specific intra prediction mode in the MPM list; and generating a prediction block of the current block based on an intra prediction mode specified by the MPM index, wherein the configuring the MPM list includes: deriving a first MPM list based on that the intra prediction mode of the left neighboring block and the intra prediction mode of the upper neighboring block are non-angular modes, and wherein the first MPM list comprises a horizontal intra prediction mode a value of which is 18, a vertical intra prediction mode a value of which is 50, an intra prediction mode having a value of 46 obtained by subtracting 4 from the value of the vertical intra prediction mode, and an intra prediction mode having a value of 54 obtained by adding 4 to the value of the vertical intra prediction mode.

* * * * *